United States Patent [19]

Hendow et al.

[11] Patent Number: 4,836,675

[45] Date of Patent: Jun. 6, 1989

[54] APPARATUS AND METHOD FOR DETECTING ROTATION RATE AND DIRECTION OF ROTATION AND PROVIDING CAVITY LENGTH CONTROL IN MULTIOSCILLATOR RING LASER GYROSCOPES

[75] Inventors: Sami T. Hendow; Graham J. Martin, both of Canoga Park, Calif.

[73] Assignee: Litton Systems, Inc., Beverly Hills, Calif.

[21] Appl. No.: 67,254

[22] Filed: Jun. 29, 1987

[51] Int. Cl.$^4$ .............................................. G01C 19/64
[52] U.S. Cl. ................................................... 356/350
[58] Field of Search ......................................... 356/350

[56] References Cited

U.S. PATENT DOCUMENTS

| | | | |
|---|---|---|---|
| 3,395,270 | 7/1968 | Speller | 235/150.25 |
| 3,411,849 | 11/1968 | Aronowitz | 356/28 |
| 3,503,005 | 3/1970 | Mocker | 331/94.5 |
| 3,697,887 | 10/1972 | Lee et al. | 331/94.5 |
| 3,741,657 | 6/1973 | Andringa | 356/350 |
| 3,826,575 | 7/1974 | Walter, Jr. | 356/350 |
| 3,854,819 | 12/1974 | Andringa | 356/350 |
| 3,921,099 | 12/1975 | Abrams et al. | 331/94.5 |
| 4,108,553 | 8/1978 | Zampeillo et al. | 356/350 |
| 4,123,162 | 10/1978 | Sanders | 356/350 |
| 4,141,651 | 2/1979 | Smith et al. | 356/350 |
| 4,229,106 | 10/1980 | Dorschner | 356/350 |
| 4,247,832 | 1/1981 | Sanders et al. | 331/94.5 |
| 4,267,478 | 5/1981 | Ljung et al. | 310/315 |
| 4,320,974 | 3/1982 | Ljung | 356/350 |
| 4,383,763 | 5/1983 | Hutchings et al. | 356/350 |
| 4,449,824 | 5/1984 | Matthews | 356/350 |
| 4,470,701 | 9/1984 | Smith | 356/350 |
| 4,473,297 | 9/1984 | Simpson et al. | 356/350 |
| 4,482,249 | 11/1984 | Smith, Jr. et al. | 356/350 |
| 4,585,346 | 4/1986 | Ljung | 356/350 |
| 4,597,667 | 7/1986 | Curby et al. | 356/350 |
| 4,616,930 | 10/1986 | Martin | 356/350 |
| 4,637,255 | 1/1987 | Martin | 73/517 R |
| 4,687,331 | 8/1987 | Holz et al. | 356/350 |

FOREIGN PATENT DOCUMENTS

0130766 1/1985 European Pat. Off. .

OTHER PUBLICATIONS

Kaminow, "Balanced Optical Discriminator", *Applied Optics*, Apr. 1964, vol. 3, No. 4, pp. 507–510.

H. de Lang, "Polarization Properties of Optical Resonators Passive and Active", Thesis, University of Utrecht, Dec. 1966, pp. 1–76.

Coccoli, "An Overview of Laser Gyroscopes", Twelfth Joint Services Data Exchange for Inertial Systems, Oct. 1978.

Menegozzi et al., "Theory of a Ring Laser", *Physical Review*, Oct. 1973, vol. 8, No. 4, pp. 2103–2125.

A. D. White, "Frequency Stabilization Gas Lasers", IEEE, Journal of Quantum Electronics, vol. QE-1, No. 8, Nov. 1965, pp. 349 and 355.

Killpatrick, "The Laser Gyro", IEEE Spectrum, Oct. 1967, pp. 44–55.

Chow et al., "Multioscillator Laser Gyros", IEEE Journal of Quantum Electronics, Sep. 1980, vol. QE-16, No. 9, pp. 918–940.

Chow et al., "The Ring Laser Gyro", Review of Modern Physics, vol. 57, No. 1, Jan. 85, pp. 61–104.

H. de Lang, "Eigenstates of Polarization in Lasers", Philips Research Reports, vol. 19, pp. 429–440.

*Primary Examiner*—Vincent P. McGraw
*Attorney, Agent, or Firm*—Lynn & Lynn

[57] ABSTRACT

A multioscillator ring laser gyroscope includes a frame that encloses a closed optical path in which four circularly polarized optical waves propagate. A combining optics system combining the waves to produce an interference pattern. A pair of photodetectors are placed in the interference pattern in half quadrature with respect to the interference pattern so that the detectors produce oscillatory output signals that are in quadrature with respect to each other. Signals indicative of the beat signal in the interference pattern are processed to determine the rotation rate, the direction of rotation and to provide a cavity length control signal.

43 Claims, 17 Drawing Sheets

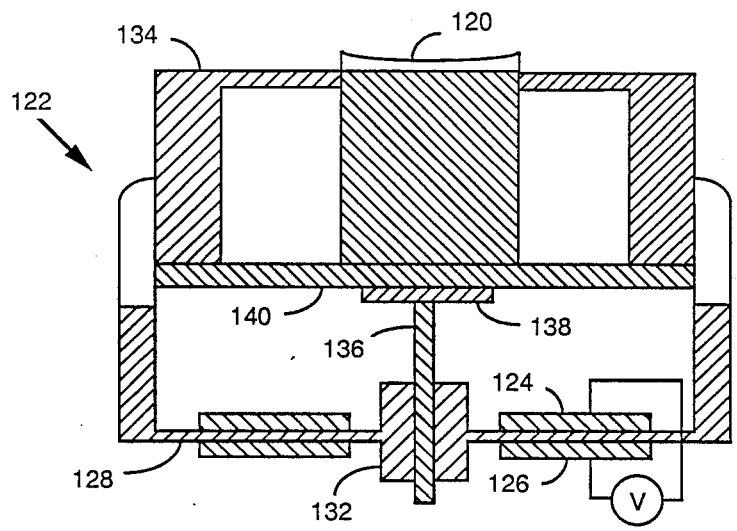
FIG. 13
(PRIOR ART)
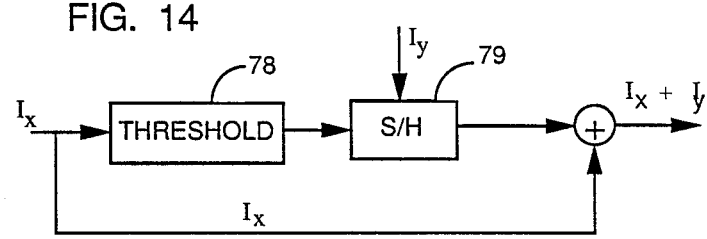

APPARATUS AND METHOD FOR DETECTING ROTATION RATE AND DIRECTION OF ROTATION AND PROVIDING CAVITY LENGTH CONTROL IN MULTIOSCILLATOR RING LASER GYROSCOPES

BACKGROUND OF THE INVENTION

This invention relates generally to rotation sensors and particularly to Sagnac ring rotation sensors. More particularly, this invention relates to multioscillator ring laser gyroscope rotation sensors. Still more particularly, this invention relates to apparatus and methods for measuring rotation rates, providing path length control and determining the direction of rotation in a multioscillator ring laser gyroscope.

A ring laser gyroscope employs the Sagnac effect to detect rotation. Two counter propagating light beams in a planar closed loop will have transit times that differ in direct proportion to the rotation rate of the loop about an axis perpendicular to the plane of the loop. The planar ring laser gyroscope has the simplest type of optical path. However, other path geometries provide advantages over the planar path.

There are in general two basic techniques for utilizing the Sagnac effect to detect rotations. A first technique is the interferometric approach, which involves measuring the differential phase shift between two counterpropagating beams injected from an external source, typically a laser, into a Sagnac ring. The ring may be defined by mirrors that direct the light beams around the path or by a coil of optical fiber. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

A ring laser gyroscope has a sensing axis that passes through the closed path traversed by the counterpropagating beams. For a planar path, the sensing axis is conveniently normal to the path. In an out of plane gyro, the sensing axis may be a line normal to the projection of the path upon a plane. When the ring laser gyroscope is not rotating about its sensing axis, the optical paths for the two counterpropagating beams have identical lengths so that the two beams have identical frequencies. Rotation of the ring laser gyroscope about its sensing axis causes the effective path length for light traveling in the direction of rotation to increase while the effective path length for the wave traveling opposite in direction to the rotation decreases.

The ring laser gyroscope uses the resonant properties of a closed cavity to convert the Sagnac phase difference between the counter propagating beams into a frequency difference. Ring laser gyroscopes may be classified as passive or active, depending upon whether the gain medium is external or internal to the cavity. In the active ring laser gyroscope the cavity defined by the closed optical path becomes an oscillator, and output beams from the two directions interfere to give a beat frequency that is a measure of the rotation rate. The oscillator approach means that the frequency filtering properties of the cavity resonator are narrowed by many orders of magnitude below the passive cavity to give the potential for very precise rotation sensing. To date, the mayor ring laser gyroscope rotation sensor effort has been put into the active ring laser. Presently all commercially availabe optical rotation sensors are active ring laser gyroscopes.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates the ring laser gyroscope produces a false indication that the device is not rotating. If the rotation rate of a ring laser gyroscope starts at a value above that where lock-in occurs and is then decreased, the frequency difference between the beams disappears at a certain input rotation rate. This input rotation rate is called the lock-in threshold. The range of rotation rates over which lock-in occurs is generally called the deadband of ring laser gyroscope.

Lock-in arises from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

In addition to causing erroneous rotation rate information to be output from a ring laser gyroscope, lock-in causes standing waves to appear on the mirror surfaces. These standing waves may create a grating of high and low absorption regions, which creates localized losses that increase the coupling and the lock-in. The mirrors may be permanently affected by leaving a ring laser gyroscope operating in a lock-in condition.

Any inability to accurately measure low rotation rates reduces the effectiveness of ring laser gyroscope in navigational systems. There has been substantial amount of research and developement work to reduce or eliminate the effects of lock-in to enhance their effective use in such systems.

There are several known attempts to slove the problems of lock-in. One such approach involves mechanically oscillating the ring laser gyroscope about its sensor axis so that the device is constantly sweeping through the deadband and is never locked therein. This mechanical oscillation of the ring laser gyroscope is usually called dithering. A typical ring laser gyroscope may be dithered at about 400 Hz with an angular displacement of a few arc minutes.

Mechanically dithering the ring laser gyroscope body is accomplished by mounting the ring laser gyroscope frame on a flexure device that includes a plurality of vanes or blades extending from a central portion. Each blade has a pair of piezoelectric elements mounted on opposite sides thereof. Voltages are applied to the piezoelectric elements such that one piezoelectric element on each blade increases in length while the other piezoelectric element decreases in length. The effect of these length changes in the piezoelectric elements is transmitted to the blades through the mounting of the piezoelectric elements thereon. Increasing the length of one side of each blade while shortening the other side causes the blades to flex or bend so that the end of each blade experiences a small rotation about the ring laser gyroscope axis. The voltage is oscillatroy so that the blades are constantly vibrating in phase, and the ring laser gyroscope frame mounted to the blades rotates about the axis.

The amplitude of the dithering is generally carefully controlled and monitored to minimize the effects of lock-in. Since the dither oscillation angular velocity and displacement relative to a support structure can be constantly monitored, they may be excluded from the output signal of the ring laser gyroscope. However, it has been found that a constant dithering amplitude is inadequate to eliminate all of the effects of lock-in.

Body dither must be accomplished so that dither oscillations cause the ring laser gyroscope frame to rotate only about the sensing axis. Any small component of rotation about other axes causes the sensing axis to precess in a cone-shaped path about the direction in which it should point.

This motion of the axis is called coning. Any change in the direction of the axis due to dithering introduces errors into the output of the ring laser gyroscope. Since a navigation system includes three ring laser gyroscopes mounted in an instrument block with the sensing axes being mutually orthogonal, mechanical coupling of the dither oscillations is likely.

Mirror dither is another approach that has been investigated in attempts to reduce the effects of lock-in. One or more of the mirrors that define the optical path may be oscillated at a very small amplitude. The Doppler effect causes a difference between the frequency of backscattered light forward reflected light. Transverse dithering of all four mirrors of a rectangular gyro shifts only the frequency of the backscattered beam. However, transverse mirror dither is difficult to implement because of the large amount of energy required to move mirrors that are mounted to the gyro body. Longitudinal mirror dither is easier to implement, but it shifts the frequencies of both the forward and backscattered light. Therefore, the analysis of signals in a longitudinally mirror dithered gyro is complicated.

One approach to reducing lock-in error is to superimpose a random signal upon the amplitude of the dither driving amplifier. However, the superposition of a random signal on the dither driver produces other substantial errors.

Another approach uses a Faraday cell to apply an alternating bias to the gain medium. The driving function for the Faraday cell dithered bias is the voltage applied to the Faraday cell coil. The voltage may change quickly, but the coil current and, hence, the magnetic field change slower than the voltage because of the resistance-inductance time constant of the coil.

It should be noted that when the sign of direction of the dither reverses, the two beams tend to lock-in since at some point the frequency difference therebetween is zero. Since the output angle of the ring laser gyroscope is generally derived from the frequency difference, which locks in to indicate a zero rotation rate even if the actual rotation rate is non-zero, an error accumulates in the output angle. The periods of time when the two beams are locked in are usually very short so that the resulting output angle error is very small for any single sign change. Nevertheless, the error resulting from lock-in during sign reversal of the frequency difference is cumulative, and in time may become significant, particularly in precision navigational systems. This error is sometimes called random walk or random drift.

Still another technique for optical biasing to prevent lock-in is to use a twin ring gyro. The two optical paths are arranged so that they share the same magnetic biasing element. The paths of the beams are not identical, which is a source of error.

The multioscillator ring laser provides the capability of avoiding the dither requirement of the basic two beam ring laser devices to prevent lock-in. The fundamental principles of multioscillator ring laser gyroscopes are explained in Chow, et al. "Multioscillator Ring Laser Gyros", *IEEE Journal of Quantum Electronics*, Vol. QE-16, No. 9, pp. 918–936, September, 1980. A multioscillator ring laser gyro includes a pair of two mode ring lasers sharing the same cavity and having orthogonal circular polarizations. Therefore, there is a right circularly polarized wave and a left circularly polarized wave propagating in each direction around the cavity. Bias elements are used to separate the frequencies of the waves, but by taking the difference of the beat notes from the two ring lasers permits cancellation of the bias and doubles the rotation rate sensitivity.

Cavity length control is essential in a ring laser so that light beams of the desired frequencies propagate. The scale factor that relates the rotation rate to the fringe pattern depends upon the frequency of the beams. Previous cavity length control techniques have depended upon measuring the intensity of at least one of the counter-propagating beams. These intensity measurements require having a mirror that transmits a small part of the light in the cavity to a photodetector that produces an electrical signal indicative of the intensity of the light in the cavity. However, cavity length control signals obtained from intensity measurements are subject to DC drift and noise.

SUMMARY OF THE INVENTION

This invention provides a multimode ring laser gyroscope in which the fringe spacing used for measuring rotation rates is the same as that from an ordinary two mode gyro and which processes electrical signals indicative of the fringe pattern to determine the direction of rotation and to provide a cavity length control signal. The multioscillator optical output is incident upon a pair of photodetectors that are preferably in half quadrature with respect to the fringe pattern produced by the interfering waves. The two detectors spaced ⅛th of a fringe apart can provide a signal that can be used to determine the rotation rate and direction of rotation in multioscillator gyros.

Cavity length control is achieved by monitoring the outputs of both detectors. The techniques of the present invention do not require any form of frequency or body dither. The multioscillator ring laser is preferably operated so that the waveforms incident upon the two detectors are linearly polarized and identical except for a phase shift. The signals incident upon the detectors are amplitude modulated carrier signals. The phases of the the signals incident upon the detectors depend upon the amplitudes of the modes. When the amplitudes of the modes are maximized, the phases of the carriers are the same for both detectors. As the cavity detunes due to thermal fluctuations, mirror creep, etc., the phase of one carrier advances while the other retards. Therefore, monitoring the phase difference of the carrier signals for the two detectors provides a cavity length control signal.

At the optimum tuning point of the cavity, the modulation depth is 100%. Detuning away from the optimum point reduces the depth of modulation. At zero detuning, the phase difference between the carrier waves of the two detected signals continuously alternates between zero and 180°. Detuning away from "line center" leads to a definite phase shift between the two carrier waves. The sign of the phase shift between the carrier waves depends on the sign of detuning. Therefore, there is no need to dither the gyro for cavity length control.

A multioscillator ring laser gyroscope according to the invention comprises a frame for forming a cavity that encloses a closed optical path; means for producing four circularly polarized optical waves inside the cavity; means for combining the waves to produce an interference pattern; means for determining the direction of the rotation of the multioscillator ring laser gyroscope from the interference pattern; and means for processing the interference pattern to provide a cavity length control signal. The multioscillator ring laser gyroscope of the invention includes a plurality of mirrors mounted to the frame. The mirrors preferably divide the cavity into a plurality of cavity segments arranged such that the optical path is non planar.

The means for processing the interference pattern to provide a cavity length control signal includes: a pair of photodetectors positioned to receive the interference pattern thereon. The first photodetector produces a signal $I_x$ indicative of the optical intensity incident thereon, and the second photodetector produces a signal $I_y$ indicative of the optical intensity thereon, the photodetectors being spaced apart so that they are in half quadrature with respect to the interference pattern; means for determining the occurrence of zero crossing in the signal $I_x$; means for monitoring the amplitude of the signal $I_y$; and means for moving at least one of the mirrors relative to the frame to adjust the length of the optical path such that the amplitude of the signal $I_y$ is zero at the zero crossings of the signal $I_x$.

The means for determining the occurrence of zero crossing in the signal $I_x$ includes a zero crossing trigger connected to receive the signal $I_x$ from the first photodetector for producing a trigger signal when the signal $I_x$ has zero amplitude. The multioscillator ring laser gyroscope of the invention may also include an anolog to digital converter connected to the second photodetector to receive the signal $I_y$ as an input and connected to the zero crossing trigger to receive the trigger signal, which actuates the analog to digital converter to produce an output that is indicative of the amplitude of the signal $I_y$.

The means for determining the occurrence of zero crossing in the signal $I_x$ in the multioscillator ring laser gyroscope may include an amplifier connected to receive the signal $I_x$ from the first photodetector; a comparator for comparing the output of the amplifier to a reference voltage, the comparator producing a rectangular wave output when the amplitude of the signal from the amplifier exceeds the reference voltage; and a monostable circuit connected to receive the output of the comparator, the monostable producing an output pulse indicative of the positive-going edge of the comparator output. The multioscillator ring laser gyroscope of the invention may further include a second amplifier connected to the second photodetector to receive the signal $I_y$; and a sample and hold circuit connected to the output of the second amplifier and connected to the monostable circuit such that the pulses outpug from the monostable activate the sample and hold circuit to provide an output signal indicative of the amplitude of the signal $I_y$ at the zero crossing of the signal $I_x$. The multioscillator ring laser gyroscope may further include an integrator connected to the sample and hold circuit to produce a signal indicative of the time average of the signal $I_y$ at the zero crossing of the signal $I_x$; a power amplifier connected to the output of the integrator; and a mirror actuator connected to the power amplifier.

The means for determining the direction of detuning of the cavity length of the multioscillator ring laser gyroscope from the interference pattern preferably includes multiplying means for producing a signal indicative of the product of the signals $I_x$ and $I_y$; a comparator connected to the multiplying means to compare the product of the signals $I_x$ and $I_y$ to a reference voltage; means for producing a signal indicative of the value of the signal $I_y$ at the zero crossing of the signal $I_x$; and a logic gate connected to receive input signals from the output of the first comparator and the means for producing a signal indicative of the value of the signal $I_y$ at zero crossing of the signal $I_x$, the logic gate being configured to determine the sign of the voltage of the signal $I_y$ at the zero crossing of the signal $I_x$. The means for determining direction of cavity length drift depends on examining the phases of the two signals $I_x$ and $I_y$ and is not limited to the apparatus described above. Other apparatus, such as a sample and hold circuit, may be used to determine the direction of cavity drift.

The method of the invention for measuring rotations with a multioscillator ring laser gyroscope comprises the steps of forming a cavity in a frame to enclose an optical path; producing four circularly polarized optical waves inside the cavity; combining the waves to produce an interference pattern; determining the direction of the rotation of the multioscillator ring laser gyroscope from the interference pattern; and processing the interfenence pattern to provide a cavity length control signal.

The method of the invention preferably includes the step of mounting a plurality of mirrors the the frame means so that the mirrors divide the cavity into a plurality of cavity segments and being arranged such that the optical path is non planer.

The step of processing the interference pattern to provide a cavity length control signal preferably includes the steps of placing a pair of photodetectors to receive the interference pattern thereon; producing a signal $I_x$ with a first one of the photodetectors to indicate the optical intensity incident thereon; producing a signal $I_y$ with the other one of the photodetectors to indicate the optical intensity thereon; spacing the first and second photodetectors spaced so that they are in half quadrature with respect to the interference pattern; determining the occurrence of zero crossings in the signal $I_x$; monitoring the amplitude of the signal $I_y$; and moving at least one of the mirrors relative to the frame to adjust the length of the optical path such that the amplitude of the signal $I_y$ is zero at the zero crossings of the signal $I_x$.

The step of determining the occurrence of zero crossing in the signal $I_x$ includes connecting a zero crossing trigger to receive the signal $I_x$ from the first photodetector; and producing a trigger signal when the signal $I_x$ has zero amplitude. The method may also include the steps of connecting an analog to digital converter to the second photodetector to receive the signal $I_y$ as an input; connecting the analog to digital converter to the zero crossing trigger to receive the trigger signal; and actuating the analog to digital converter to produce an output that is indicative of the amplitude of the signal $I_y$.

The step of determining the occurrence of zero crossing in the signal $I_x$ includes the steps of connecting an amplifier to receive the signal $I_x$ from the first photodetector; comparing the output of the amplifier to a reference voltage with a comparator; producing a rectangular wave output when the amplitude of the signal from the amplifier exceeds the reference voltage; connecting a monostable circuit to receive the output of the comparator; and producing an output pulse indicative of the positive-going edge of the comparator output with the monostable circuit. The method of the invention may further include the steps of connecting a second amplifier to the second photodetector to receive the signal $I_y$; sampling and holding the output of the second amplifier with a sample and hold circuit; activating the sample and hold circuit with pulse output from the monostable to provide an output signal indicative of the amplitude of the signal $I_y$ at the zero crossing of the signal $I_x$. The method may further include the steps of: producing a signal indicative of the time average of the signal $I_y$ at the zero crossing of the signal $I_x$; amplifying the signal indicative of the time average of the signal $I_y$ at the zero crossings of the signal $I_x$; and driving a mirror actuator with the power amplifier.

The step of determining the direction of detuning of the cavity length of the multioscillator ring laser gyroscope from the interference pattern includes the steps of producing a signal indicative of the product of the signals $I_x$ and $I_y$; connecting a comparator to the multiplying means to compare the product of the signals $I_x$ and $I_y$ to a reference voltage; producing as signal indicative of the value of the signal $I_y$ at the zero crossings of the signal $I_x$; and processing input signals from the output of the first comparator and the means for producing as signal indicative of the value of the signal $I_y$ at the zero crossings of the signal $I_x$ with a logic gate configured to determine the sign of the voltage of the signal $I_y$ at the zero crossings of the signal $I_x$.

Detection of rotation rate is obtained by demodulating the signal $I_x$. This demodulation amounts to detecting the envelope of the fast oscillating wave $I_x$ and then counting the number of complete cycles in the envelope. The number of cycles in the envelope of the signal $I_x$ is indicative of the rotation rate. At zero rotation rates, the frequency of the envelope drops to zero.

The detection of the direction of rotation is performed by placing the two detectors approximately in half quadrature with respect to the fringe pattern of the interfering waves. The fringe patter considered here is the envelope fo the signals $I_x$ and $I_y$, whose frequency is indicative of rotation rate. The half quadrature placement of the detectors results in the envelope of the detector signals $I_x$ and $I_y$ being in quadrature with respect to each other. At this point, detection of the direction of rotation proceeds as in previously known methods. The in-quadrature placement of the two detector signals $I_x$ and $I_y$ enables evaluation of whether the signal $I_x$ is leading or lagging the envelope of the signal $I_y$, which in turn determines whether the direction of rotation is clockwise or counterclockwise, depending on the polarity of the electronics used to process the signals.

BRIEF DESCRIPTION OF THE DRAWINGS

FIG. 13 is a cross sectional view of a diaphragm mirror and apparatus for moving the mirror to control the length of the cavity of FIG. 1;

FIG. 14 illustrates a circuit for producing a signal indicative of the sum of two signals $I_x$ and $I_y$ in the circuit of FIGS. 8 and 9 when the signal $I_x$ reaches a preset value.

DESCRIPTION OF THE PREFERRED EMBODIMENT

Figure 1:
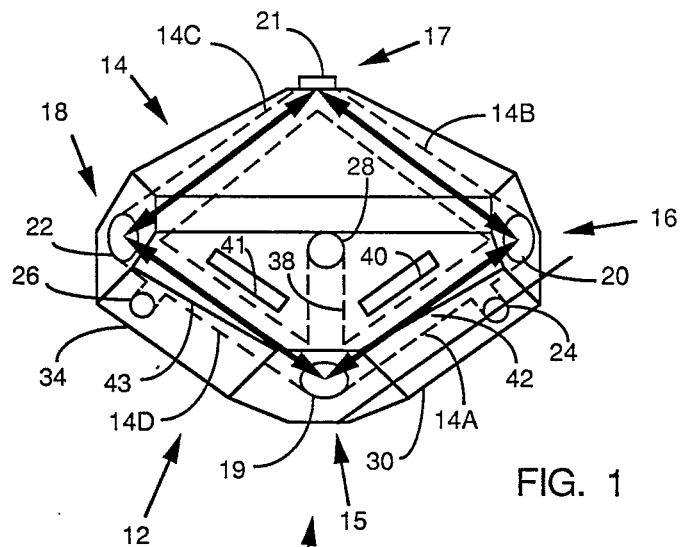
FIG. 1 is a perspective view of an out of plane ring laser gyroscope frame.
Figure 2:
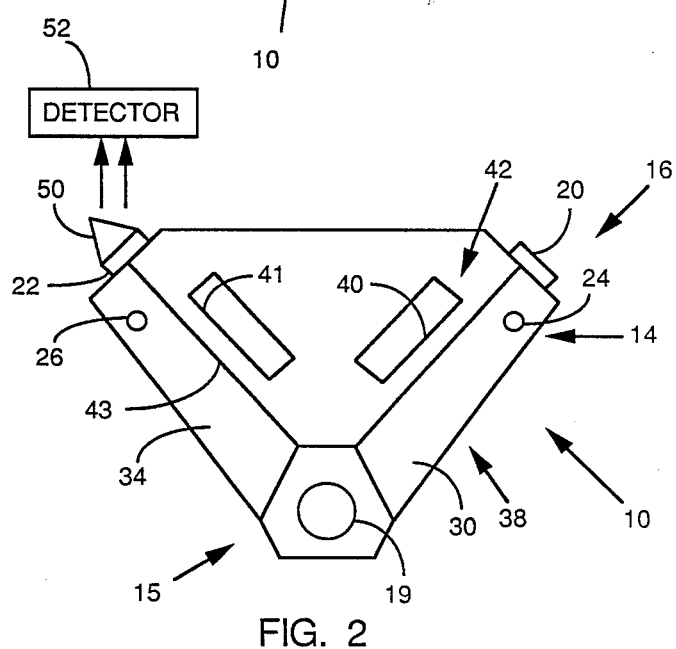
FIG. 2 is an elevation view of the out of plane ring laser gyroscope frame of FIG. 1.
Figure 3:
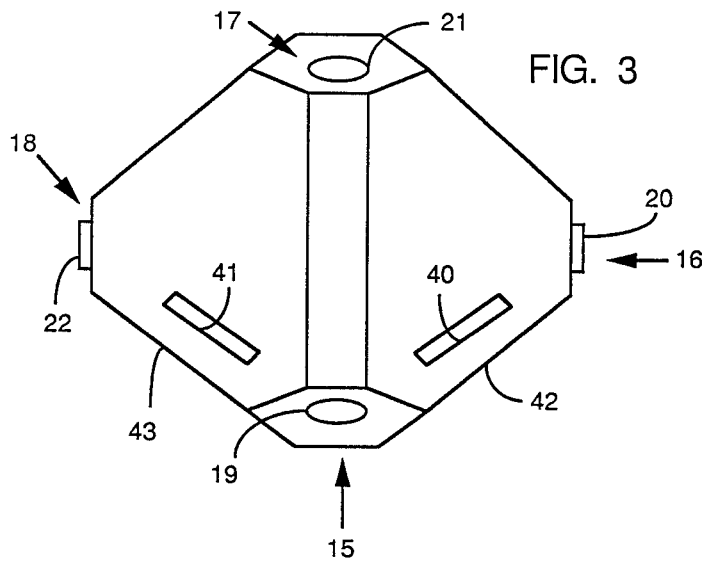
FIG. 3 is a bottom plan view of the out of plane ring laser gyroscope frame of FIG. 1.
Figure 4:
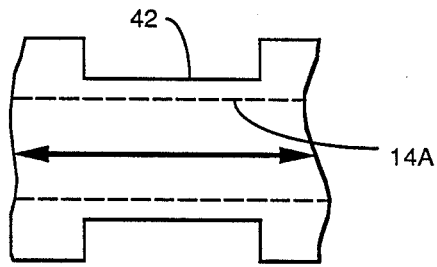
FIG. 4 is an elevation view of a portion of the frame of FIGS. 1 and 2.
Figure 5:
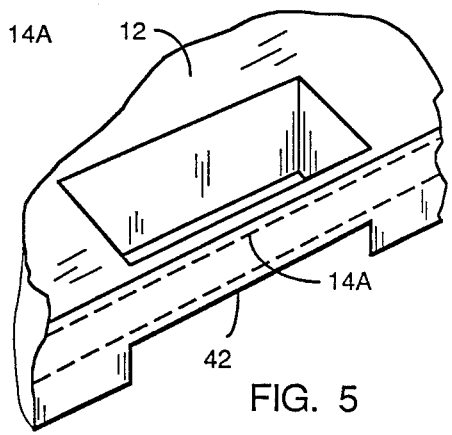
FIG. 5 is a perspective view of the frame portion of FIGS. 4.

Referring to FIGS. 1 and 2, and out of plane ring laser gyroscope 10 includes a frame 12 that is preferably formed of a material having very small dimensional changes over a temperature range of about −50° F. to +240° F. Schott glass works of West Germany sells a suitable frame material under the trademark ZERODUR. Owens, Illinois sells a suitable frame material under the trademark CERVIT. Both ZERODUR and CERVIT are mixtures of glass and ceramic materials that have opposite temperature expansion coefficients, thus providing overall minimal dimension changes over a wide range of temperatures.

A cavity 14 is formed in the frame 12. The cavity has four corners 15–18 at which mirrors 19–22, respectively, are mounted to the frame 12. The cavity 14 is shown to be formed as a skew rhombic quadrilateral, which may be visualized as a parallelogram that has been folded along one of its diagonals. This is one of many possible configurations for the cavity 14 and is described herein for the purpose of explaining the invention.

The cavity 14 may comprise a plurality of bores 14A, 14B, etc. to form a path for counter propagating light beams in the frame 12 between the mirrors 19–22. The bores are evacuated and then filled with a mixture of helium and neon. This mixture is the gain medium of the laser. A pair of anodes 24 and 26 and a cathode 28 are mounted to the frame 12 in contact with the gain medium so that application of a suitable electrical potential difference between the cathode 28 and each of the anodes 24 and 26 produces an electrical discharge in the bores 14A and 14D.

The anode 24 may be mounted to a surface 30 of the frame 12, and a passage 32 extends between the anode 24 and the bore 14A. The anode 26 may be mounted to a surface 34 of the frame 12, and a passage 36 extends between the anode 26 and the bore 14D. The cathode 28 may be mounted in the central portion of the frame 12. A passage 38 extends between the cathode 28 and the juncture of the bores 14A and 14D. Other arrangements of the anodes and cathodes are possible. The particular arrangements shown and described herein are exemplary only and do not limit the scope of the invention.

When an appropriate potential difference is applied between cathode 28 and the anodes 24 and 26, electrical discharges occurs in the bores 14A and 14D. This electrical discharge forms a plasma in cavity 14 by exciting the helium and neon atoms. Collisions with electrons excite helium atoms, which then collide with some of the neon atoms. The most probable result of collisions between the excited helium atoms and the neon atoms is a transfer of energy from the helium to the neon atoms to excite them to an unstable energy state. Electrons in the plasma also may collide with neon atoms and excite them to the same energy unstable state, but the helium atoms are the primary excitation source for raising the neon atoms to the desired energy level. The excited neon atoms return to their ground states by emitting photons. There is a spectrum of photon frequencies that may be produced when the neon atoms return to their ground state. The length of the cavity 14 between the mirrors 17–20 causes selected wavelengths to resonate when the neon atoms emit light. The resonating wavelengths lie within a gain curve, which is known in the art.

The present invention uses circularly polarized light. Upon reflection from the mirror 17, for example, a right circularly polarized (RCP) wave will experience a change to left circular polarization (LCP). In order to maintain the lasing action to produce the desired polarizations, the beams must reflect form an even number of mirrors. Both RCP and LCP waves will lase in the cavity for both the clockwise beam and the anticlockwise beam. Therefore, four different waves may propagate in the cavity 14. These four waves may be conveniently identified:

$L_a$ is the anitclockwise left circularly polarized wave;

$L_c$ is the clockwise left circularly polarized wave;

$R_a$ is the anticlockwise right circularly polarized wave; an $R_c$ is the clockwise right circularly polarized wave.

The longitudinal mode spacing of the beams may be about 1 GHz. The length of the cavity is an integer multiple of the wavelengths that lase. If the cavity length is L, then $N_1\lambda_1 = L$, where $N_1$ is an integer and $\lambda_1$ is the wavelength. The reciprocal of the wavelength is $1/\lambda_1 = N_1/L$. The corresponding frequency is $f_1 = c/\lambda_1$. Therefore, the frequency is $f_1 = cN_1/L$. If the frequency $f_1$ lases because the cavity length is an integer number of wavelengths, then the frequency $f_2$ corresponding to $(N_1+1)\lambda_1$ will also lase. This second frequency may be expressed as $f_2 = c(N_1+1)/L$. The difference in the two adjacent lasing frequencies is the mode spacing, which is $f_2 - f_1 = c/L$. A mode spacing if 1 GHz corresponds to a cavity length of about 30 cm.

Figure 7:
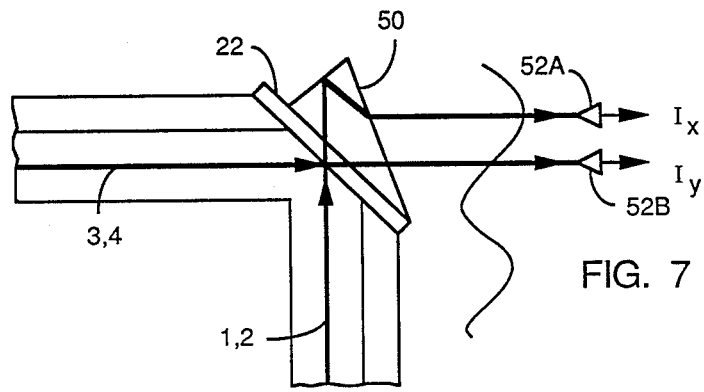
FIG. 7 illustrates optical signals exiting the multioscillator ring laser gyroscope of FIG. 1 and impinging upon a pair of heterodyne detectors in half quadrature.

Referring to FIGS. 2 and 7, a combining prism 50 is mounted to one of the mirrors, for example, the mirror 22, combines these modes to form a fringe pattern on a detector 52 that includes a pair of heterodyne detectors 52A and 52B. Other optical systems for combining the beams may be used. The combining prism 50 is an exemplary preferred embodiment that does not limit the scope of the invention. The heterodyne detectors 52A and 52B are separated by a distance, for example, of about 0.5 mm and provide electrical output signals that are referred to as $I_x$ and $I_y$, respectively. The prism 50 is arranged relative to the light beams so that the width of the fringe pattern is such that the two detectors 52A and 52B are out of phase with each other. Multioscillator beat signals are obtained when the detectors 52A and 52B are separated by a distance of approximately ⅛ the fringe width, which is a condition known as half quadrature.

FIG. 13 shows a movable mirror and apparatus for moving the mirror to provide cavity length control. The mirror is constrained to translation and is mounted on a post. The periphery of the mirror is sufficiently thin that it will flex to permit the center of the mirror to move through a distance adequate to adjust the cavity length to its optimum value. An actuator is mounted to the mirror to translate the post. Cavity length control is accomplished by applying a voltage to the mirror actuator, which preferably includes a pair of piezoelectric plates mounted on opposite sides of a thin membrane. The voltage causes one of the piezoelectric plates to contract while the other expands, which moves the membrane, and consequently the mirror, in or out with respect to the cavity. The structure of the movable mirror 19 and the actuator 86 are described in U.S. Pat. No. 4,383,763 issued May 17, 1983 to Hutchings et al. The disclosure of that patent is hereby incorporated by reference into this disclosure.

Figure 8:
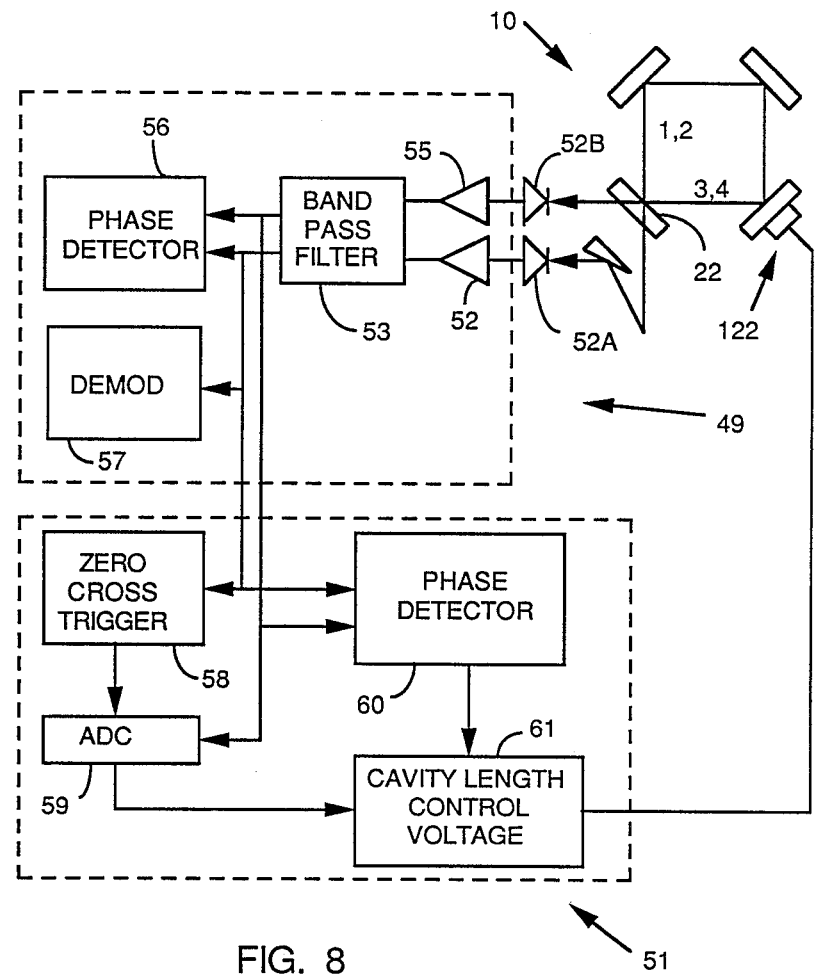
FIG. 8 is a block diagram of one electrical circuit that may be used to analyze the signals output from the heterodyne detectors of FIG. 7 to determine the rotation rate and direction and provide cavity length control for the ring laser gyroscope of FIG. 1.

Referring to FIG. 8, the apparatus of the invention includes a circuit 49 that determines the rotation rate and direction of rotation and a cavity length control circuit 51. The circuit 49 includes an amplifier 52 that amplifies the electrical signal output from the detectors 52A and provides the amplified signal to a bandpass filter array 53. Similarly, an amplifier 55 amplifies the electrical signal output from the detectors 52B and provides the resulting amplidied signal to the bandpass filter array 53, which includes separate filter sections (not shown) for filtering the amplified signals input thereto. The bandpass filter array 53 provides the two amplified and filtered heterodyne signals to a phase detector 56, which is used to determine the direction of rotation. The amplified and filtered heterodyne signal $I_x$ from the detectors 52A is also input to a demodulator 57 that is used to determine the rate of rotation of the laser gyroscope 10 about its sensing axis.

There are several cavity length control methods that rely on the examination of the phase of the signals $I_x$ and $I_y$. Four circuits are shown in FIGS. 8–11 as examples of suitable cavity length control techniques. The simplest cavity length control technique to implement is that of FIG. 11.

The cavity length control circuit 51 includes a zero crossing trigger 58 connected to the output of the bandpass filter 53 corresponding to the $I_x$ signal and an analog to digital converter 59 connected to the $I_y$ output of the bandpass filter 53. A phase detector 60 receives both the $I_x$ and $I_y$ signals from the bandpass filter 53. The zero crossing trigger 58 provides a triggering signal to the analog to digital converter 59 upon detection of a zero crossing in the $I_x$ signal. The phase detector 60 determines the sign of the cavity drift from the preferred length and provides a signal indicative of this sign to a cavity length control voltage source 61, which also receives an output from the analog to digital converter 59 to indicate the amount of cavity drift. The voltage source 61 then provides a cavity length control voltage to a cavity length control actuator 122, which is described with reference to FIG. 13.

Figure 9:
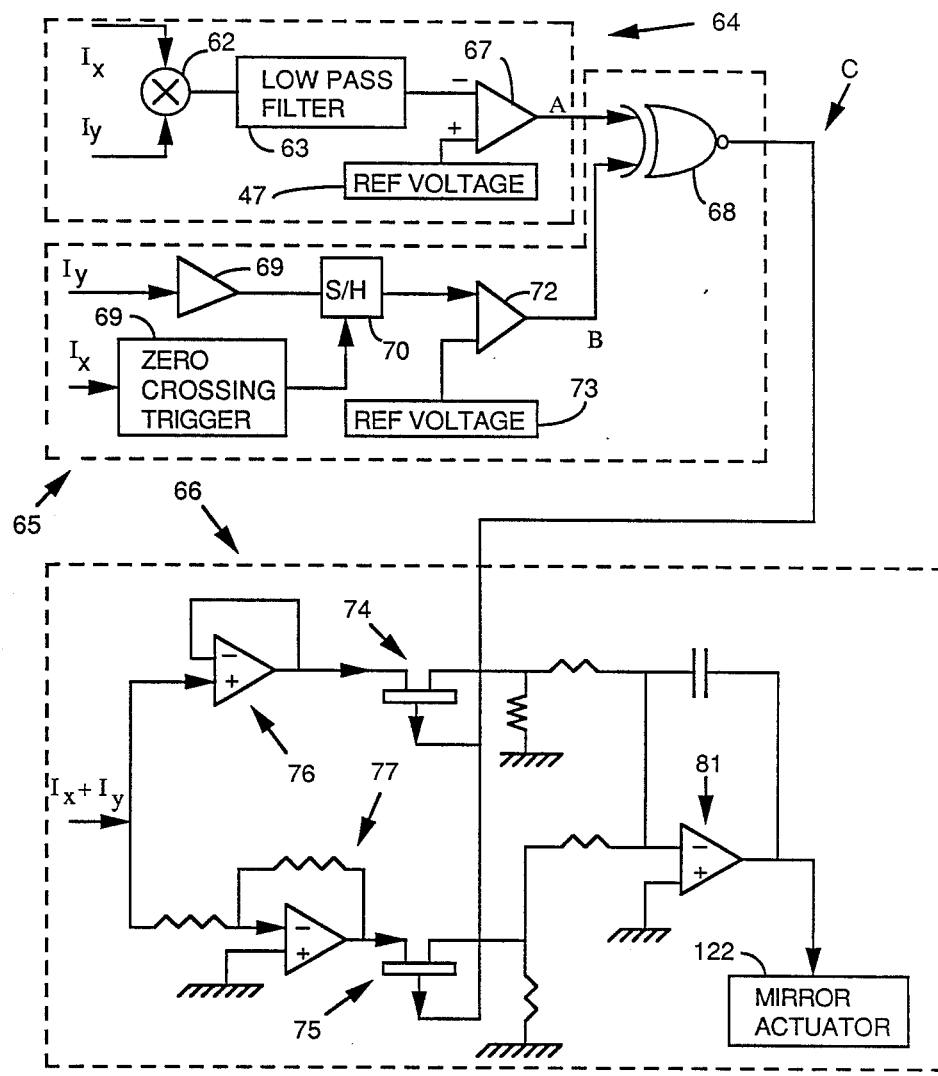
FIG. 9 is a block diagram of a cavity length control circuit included in the circuit of FIG. 8.

FIG. 9 shows additional circuitry that may be used to implement the cavity length control function of the invention. FIG. 9 depicts a phase reversal determination circuit 64, a phase lead/lag determination circuit 65 and a sign attachment circuit 66.

In the phase reversal determination circuit 64 the signals $I_x$ and $I_y$ are multiplied in a multiplying circuit 62 before being input to a lowpass filter 63. The signal $I_x$ may be represented by $\cos \omega t$ while the signal $I_y$ is represented by $\cos(\omega t + \phi)$, where $\omega$ is the frequency and $\phi$ is the phase difference of the signals $I_x$ and $I_y$. The output of the filter 63 is a DC term proportional to $\cos \phi$. The filtered product of the signals is then input to a comparator 67, which compares the signal input thereto with a reference voltage from a voltage reference source 68. The output of the comparator indicates when the phase relationship of the signals $I_x$ and $I_y$ changes. The product of the signals $I_x$ and $I_y$ is positive when they are in phase and negative when they are out of phase. The product of $I_x$ and $I_y$ is input to the negative terminal of the comparator 67. The positive reference voltage is set to be less than the absolute value of the product of $I_x$ and $I_y$. Therefore, comparing the product of $I_x$ and $I_y$ with the positive reference voltage produces a signal indicative of the phase relationship between the signals $I_x$ and $I_y$.

The phase lead/lag determination circuit 65 determines which waveform, $I_x$ or $I_y$, leads the other. This determination is preformed by determining the sign of the voltage measurement of $I_y$ at the zero crossing $i_x$.

The output of the comparator 67 is a signal A which is input to an exclusive NOR gate 68 in the phase lead/lag determination circuit 65. The exclusive NOR gate 68 produces an output signal C. The phase lead/lag determination circuit 66 includes an amplifier 69 that receives the signal $I_y$, amplifies it and provides the amplified $I_y$ signal to a sample and hold circuit 70. The zero crossing of the signal $I_x$ trigger the sample and hold circuit 70 so that it provides the most recent value of $I_y$ to teh negative input of a comparator 72, which receives a positive reference voltage from a voltage reference source 73. If the voltage of the signal $I_y$ is positive, then the output of the comparator 72 is positive. The output of the comparator 72 is a signal B input to the exclusive NOR gate 68, which is set to produce a logic high output only when the signals it receives from the comparator 67 in the phase reversal determination circuit 64 and the comparator 70 are the same. Thus the final determination of the phase relationship of the signals $I_x$ and $I_y$ depends on the outputs of both the comparators 67 and 72 that are applied to the inputs of the exclusive NOR gate 68. A truth table for the exclusive NOR gate 68 is given below.

| EXCLUSIVE | NOR GATE | TRUTH TABLE |
|---|---|---|
| A | B | C |
| 1 | 1 | 1 |
| 1 | 0 | 0 |
| 0 | 1 | 0 |
| 0 | 0 | 1 |

Still referring to FIG. 9, the sign attachment circuit 66 includes a pair of switches 74 and 75 connected to the output of the exclusive NOR gate 68. The switches 74 and 75 may be analog switches. A signal indicative of the sum of $I_x$ and $I_y$ is input to a pair of amplifiers 76 and 77. Referring to FIG. 14, the signal indicative of the sum of $I_x$ and $I_y$ may be produced by applying the signal $I_x$ to a threshold circuit 78 that indicates when the signal $I_x$ reaches a preset voltage. The threshold circuit 78 preferably is externally adjustable and is adjusted to indicate when $I_x$ is at about 25% of its peak-to-peak voltage swing. The circuit of FIG. 14 also includes a sample and hold circuit 79 connected to the threshold circuit 78. The sample and hold circuit 79 receives an input indicative of the signal $I_y$. The threshold circuit provides a triggering signal to the same and hold circuit to initiate an amplitude measurement of the signal $I_y$ when $I_x$ is at the preset value. The present value of $I_x$ is then added to the measured value of $I_y$ to determine $I_x+I_y$, which is then input to the amplifiers 76 and 77.

The amplifier 77 is an inverting amplifier, and the amplifier 76 is a non-inverting amplifier. Depending upon the output of the exclusive NOR gate 68 and the analog switches 74 and 75, the signal $I_x+I_y$ may be applied directly or inversely to an integrator 81, which drives the mirror actuator 122. The effect of this circuitry is to attach a sign to the absolute value of the voltage measured for the sum of $I_x$ and $I_y$.

Figure 10:
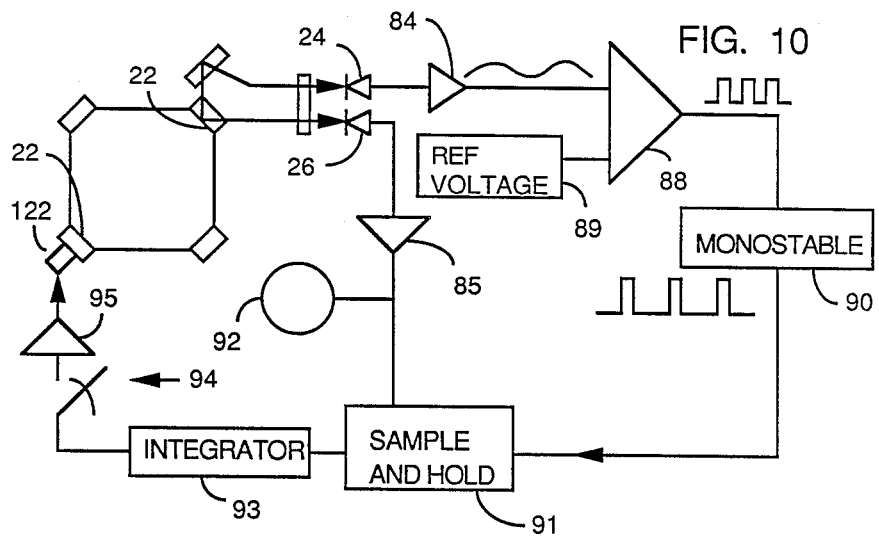
FIG. 10 is a block diagram of a second cavity length control circuit that may be included in the circuit of FIG. 8.

FIG. 10 illustrates another circuit that may be used for the cavity length control apparatus of the invention. Referring to FIG. 10, the outputs $I_x$ and $I_y$ of the heterodyne detectors 52A and 52B are input to a pair of amplifiers 84 and 85, respectively. A linear polarizer 87 may be placed between the combining optics and the detectors 52A and 52B to remove the effects of circular polarization on the interfering beams. The sinusoidal output waveform of the amplifier 84 is input to a comparator 88. The comparator 88 outputs a series of rectangular pulses that indicate when the amplitude of the sinusoid exceeds the voltage input from a voltage reference circuit 89. The output pulses of the comparator 88 are input to a monostable circuit 90 that produces a series of pulses that are input to a monostable circuit 90 that produces a series of pulses that are input to a sample and hold circuit 91. The sample and hold circuit 90 recieves the sinusoidal output of the amplifier 85. The signal from the amplifier 85 may also be displayed on an oscilloscope 92. An integrator 93 averages the output of the sample and hold circuit 91 and inputs this average to an amplifier 94 that drives the mirror actuator 122.

Figure 12:
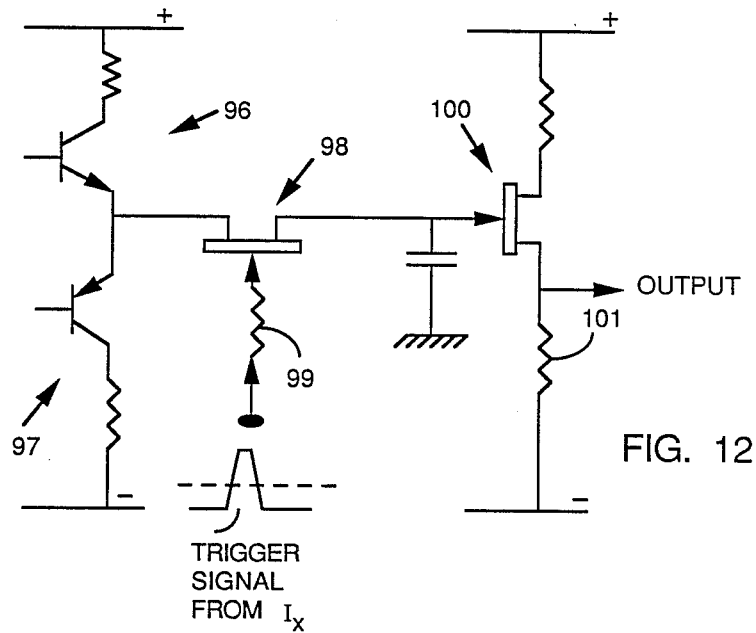
FIG. 12 illustrates circuitry that may be included in the cavity length control circuit of FIG. 11.

FIG. 12 illustrates a simplified sample and hold circuit 95 that may be included in the block diagrams of FIGS. 8-10. An NPN transistor 96 has its emitter coupled to the emitter of a PNP transistor 97 in a basic complementary power amplifier configuration. The output is taken from the connection of the two emitters and is connected to either the source or the drain of a FET 98. The signal $I_x$ is input to the gate of the FET 98 through a resistor 99 and acts as a trigger signal to cause the FET to become conductive so that the $I_y$ signal from the transistors 96 and 97 is input to the gate of a FET 100 to cause it to conduct electric current. The output of the sample and hold circuit is taken as the voltage drop across a resistor 101 connected between the source of drain of the FET 100 and a negative voltage reference.

Figure 11:
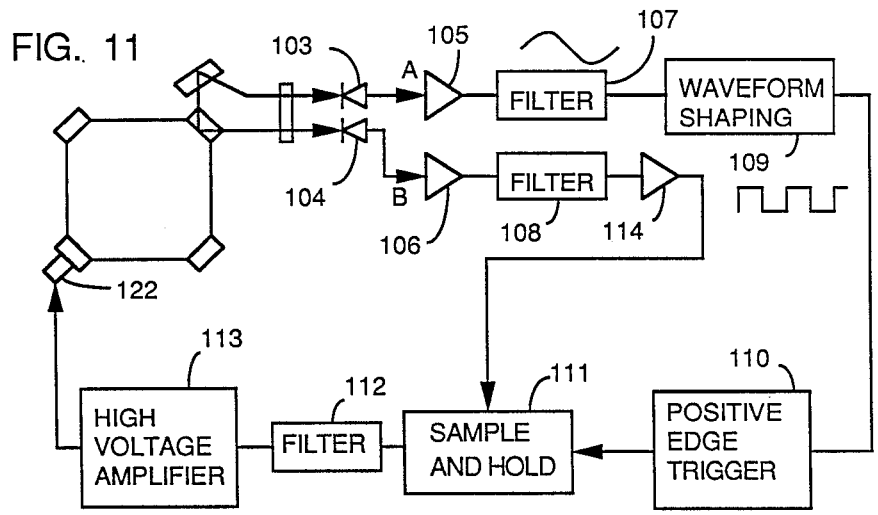
FIG. 11 is a block diagram of a third cavity length control circuit that may be used instead of the cavity length control circuit of FIG. 8.
Figure 15:
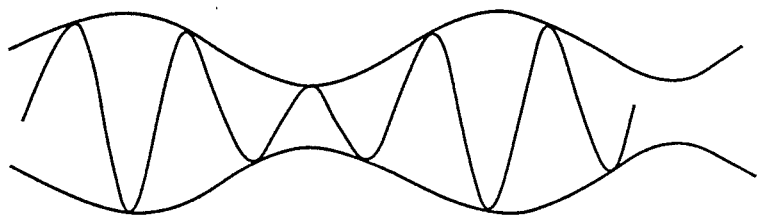
FIG. 15 graphically illustrates the signal output from the heterodyne detectors when the four modes of the multioscillator ring laser gyroscope of FIG. 1 have unequal amplitudes.
Figure 16:
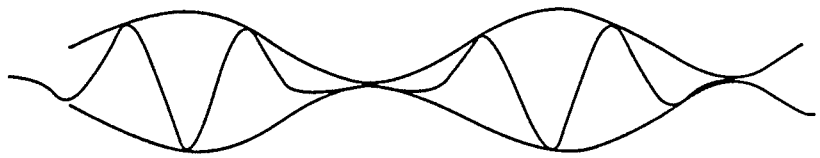
FIG. 16 graphically illustrates the signal output from the heterodyne detectors when the four modes of the multioscillator ring laser gyroscope of FIG. 1 have equal amplitudes.

FIG. 11 illustrates a circuit that is used for cavity length control of the multioscillator ring laser gyroscope 10. The circuit of FIG. 11 compares the phase of voltage differences between the frequencies generated by the Zeeman, or non-reciprocal splitting to generate a cavity length control signal.

Referring to FIG. 11, the multioscillator waves impinge upon two detectors 103 and 104 that are approximately in half quadrature. The electrical signals produced by interference of the light beams on the detectors 103 and 104 are designated $I_x$ and $I_y$, respectively. The $I_x$ and $I_y$ signals are amplified by amplifiers 105 and 106, respectively. The amplified $I_x$ and $I_y$ signals are band pass filtered by filters 107 and 108. The oscillatory $I_x$ signal then is input to a waveform shaping circuit 109 that converts the signal to a square wave. Both theoscillatory input and square wave output for the waveform shaping circuit 109 are shown in FIG. 11 adjacent the waveform shaping circuit 109. The square wave output of the waveform shaping circuit 109 is then input to a positive going edge trigger circuit 110, which controls the activation of a sample and hold circuit 11.

The filtered $I_y$ signal is amplified by an amplifier 114 and then input to the sample and hold circuit 111. The trigger circuit 110 is activated at either the positive going edge of $I_x$ at $I_x=0$ or the negative going edge. The trigger then activates the sample and hold circuit 110, which samples the waveform $I_y$. The sampled value of $I_y$ is then filtered with a filter 112 to remove high frequency components before being input to a high voltage amplifier 113, which drives the cavity length control actuator 122.

The above allows for the detection of the direction of travel of the fringe pattern by monitoring the phase difference between the two signals. Rotation rate is obtained directly from the frequency of the modulation envelope of the detected non-reciprocal carrier wave, whose frequency is typically a few 100 KHz.

Figure 34:
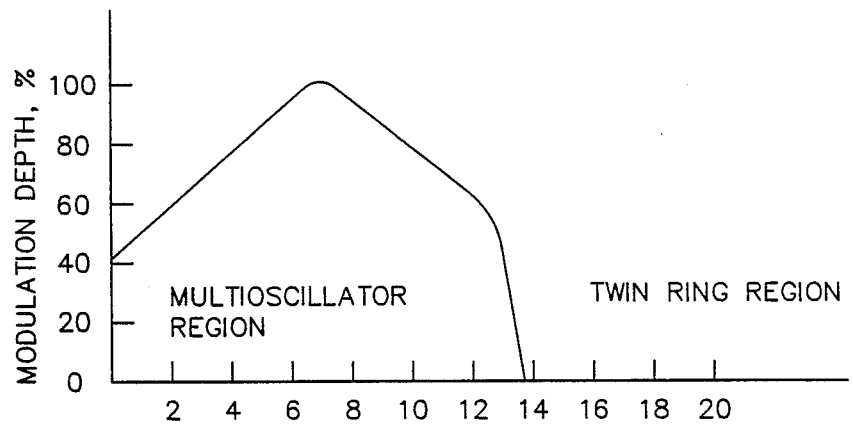
FIG. 34 illustrates the modulation depth of the heterodyne signals as a function of the voltage applied to the pathlength control device of FIG. 13.

There is only one point in detuning which corresponds to the point of zero detuning conditions. It is also the point of optimum operation at which the modulation depth of the multioscillator beat is 100% as shown in FIG. 34. This operating point is maintained regardless of the state of linear polarization of the modes exiting from the output gyro mirror and regardless of whether the gyro is rotating or not rotating.

This circuitry was used with a twin ring multioscillator ring laser gyroscope having a Zeeman splitting of about 10 KHz. This frequency allows for a moderate sampling rate of about 1 $\mu$s. Higher carrier frequencies would require higher sampling rates.

Figure 36:
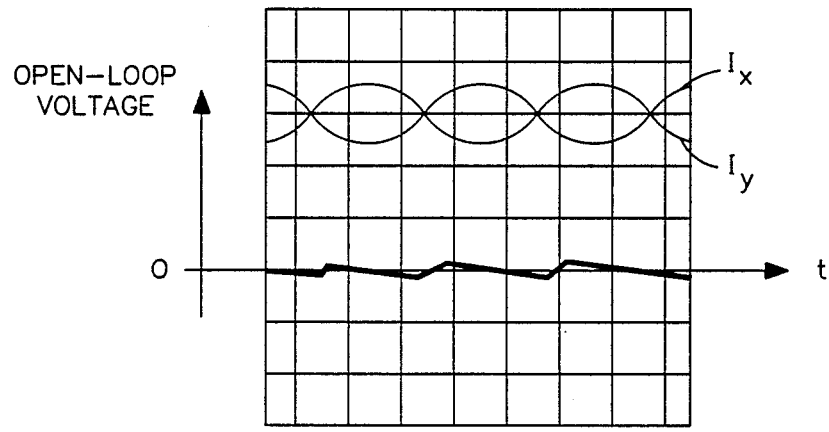
FIG. 36–38 illustrates signals output from a HeNe laser that operates at selected points on the gain curve of FIG. 36 for the cavity length control system of FIG. 11.
Figure 37:
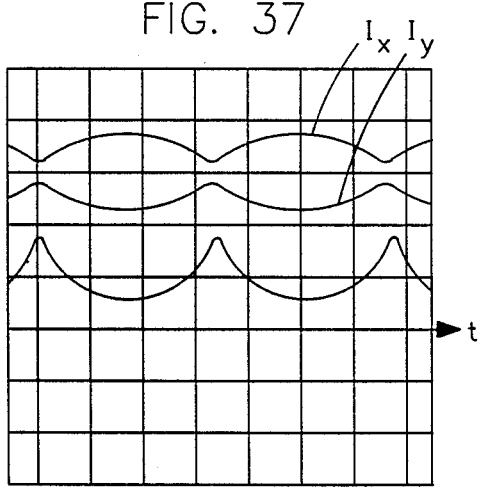
Figure 38:
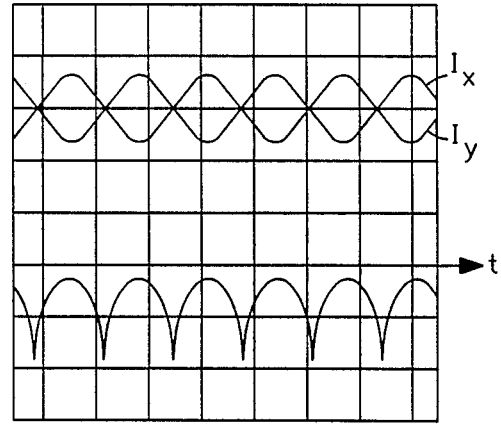

FIGS. 36–39 illustrate results of operation of the circuitry of FIG. 10. FIG. 36 shows the HeNe gain curve and indicates three possible operating points A, B and C thereon. The upper curves in FIGS. 37–39 are the signals $I_x$ and $I_y$. The lower curve is the output of the sample and hold circuit 91 of FIG. 10. FIG. 37 shows the waveforms of $I_x$ and $I_y$ for the loop conditions. FIG. 37 shows that tuning the gyro to mode center, point B on the gain curve of FIG. 36, on the HeNe gain curve gives 100% modulation depth of the multisocillator signals $I_x$ and $I_y$. Detuning the laser to either side of the maximum gain to either points A or C on the curve causes the sample and hold circuit 91 to produce an average voltage output whose sign depends on the direction of detuning. Detuning the laser increases the waist of the multioscillator signals as shown in FIGS. 38 and 39. FIG. 38 shows the multioscillator signals $I_x$ and $I_y$ that result when the laser is detuned to the point A to the left of the maximum of the gain curve. FIG. 39 shows the multioscillator signals $I_x$ and $I_y$ that result when the laser is detuned to the point C to the right of the maximum of the gain curve. It should be noted that most of the DC voltage is accumulated during the narrow waisted portions of the multioscillator signals.

At zero detuning the carrier waves in the signals $I_x$ and $I_y$ have simultaneous zero crossings. There is whoever a phase lead or lag between the carriers depending on whether the frequency drift is toward the low side or the high side. The effect of the envelope (gyro count) is to introduce phase reversals of 180° twice in each count. Therefore, it is necessary to monitor all these phases fluctuations.

In the following sections a mathematical expression is derived for the heterodyned signal at the detectors for multioscillator gyros. This expression is also shown to reduce to the two simpler cases of the ordinary two mode gyro and the twin-ring beat note. Furthermore, the above expression may be programmed on a computer such as an HP-1000 lab minicomputer so as to study the patterns generated by these signals under various operating conditions.

Figure 6:
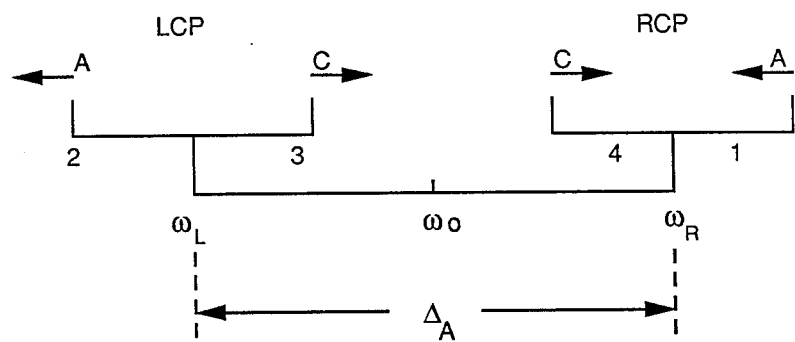
FIG. 6 graphically illustrates the frequency spectrum of the multioscillator ring laser gyroscope of FIG. 1.

Consider the frequency spectrum shown in FIG. 6 for a multioscillator gyro. The notation used subsequently is $\Delta_F$ = non-reciprocal frequency splitting;
$\Delta_r$ = rotation rate frequency splitting;
$\Delta_A$ = reciprocal frequency splitting;
L = left circularly polarized modes;
R = right circularly polarized modes;
A = anticlockwise modes; and
C = clockwise modes.

The mode frequencies are related as follows:

$$\omega_L = \frac{\nu_3 + \nu_2}{2} \quad (1)$$

$$\omega_R = \frac{\nu_1 + \nu_4}{2} \quad (2)$$

$$\Delta_A = \omega_R - \omega_L \quad (3)$$

$$\omega_O = \frac{\omega_R + \omega_L}{2} \quad (4)$$

$$\nu_1 - \nu_4 = \Delta_F - \Delta_r \quad (5)$$

$$\nu_1 + \nu_3 = 2\omega_o \quad (6)$$

$$\nu_3 - \nu_2 = \Delta_F + \Delta_r \quad (7)$$

$$\nu_1 + \nu_4 = 2\omega_R \quad (8)$$

$$\nu_2 + \nu_3 = 2\omega_L \quad (9)$$

$$\nu_2 + \nu_4 = 2\omega_o \quad (10)$$

As shown in FIG. 14, the collinear mode pairs are modes 1 and 2 and modes 3 and 4. Assume for simplicity that the z-axis is the direction of propagation of modes 1 and 2. The heterodyne detectors 52A and 52B are assumed to be in the x-y plane, and the detector 52A is placed at z=0. Detector 52B is placed on the x-axis adjacent the detector 52A. Modes 3 and 4 propagate in the x-z plane with an angle of inclination $\theta$ with respect to the z-axis. This configuration represents a typical mode mixing scheme in the multioscillator ring laser gyroscope. the polarization inside the cavity is circular, but this is ignored since the light transmitted through the mirror 22 is primarily linearly polarized. A circularly polarized wave may be resolved into the sum of two orthogonal linear polarizations. The mirror 22 transmits linearly polarized light due to the high angle of incidence on a multilayer dielectric coated mirror which leads to the elimination of one of the two linear polarization in favor of the other.

The total field of all four modes may be written as:

$$E_{tot} \propto A_1 \exp[i(k_1z - \nu_1 t - \phi_1)] + A_2 \exp[i(k_2z - \nu_2 t - \phi_2)] + A_3 \exp[i(k_3x \sin\theta + k_3z \cos\theta - \nu_3 t - \phi_3)] + A_4 \exp[i(k_4x \sin\theta + k_4z \cos\theta - \nu_4 t - \phi_4)] + C.C. \quad (11)$$

where C.C. stands for the complex conjugate terms. The intensity distribution on the detector at the z=0 plane is proportional to $E_{tot}E_{tot}^*$ and is given by:

$$I_{tot} \propto A_1^2 + A_2^2 + A_3^2 + A_4^2 + \quad (12)$$

$$A_1A_2^*\exp\{-i(\nu_1 - \nu_2)t - i(\phi_1 - \phi_2)\} +$$

$$A_1A_3^*\exp\{-i(\nu_1 - \nu_3)t - i(\phi_1 - \phi_3) - ik_3x \sin\theta]\} +$$

$$A_1A_4^*\exp\{-i(\nu_1 - \nu_4)t - i(\phi_1 - \phi_4) - ik_4x \sin\theta]\} +$$

$$A_2A_3^*\exp\{-i(\nu_2 - \nu_3)t - i(\phi_2 - \phi_3) - ik_3x \sin\theta]\} +$$

$$A_2A_4^*\exp\{-i(\nu_2 - \nu_4)t - i(\phi_2 - \phi_4) - ik_4x \sin\theta]\} +$$

$$A_3A_4^*\exp\{-i(\nu_3 - \nu_4)t - i(\phi_3 - \phi_4) - i(k_3 - k_4)x \sin\theta]\} + C.C.$$

Now setting $k_i = \nu_i/c$, where c is the speed of light and assuming $A_i$ is real where i=1 to 4 in equation (11) gives $$I_{tot} = I_a + I_b \quad (13)$$

where
$$I_a \propto A_1^2 + A_2^2 + A_3^2 + A_4^2 + 2A_1A_2\cos[(\Delta_F+\Delta_A)t - (\phi_1-\phi_2)] + 2A_3A_4\cos[(\Delta_A-\Delta_F)t - (\phi_3-\phi_4) - (\Delta_A-\Delta_F)(x/c \sin\theta)] \quad (14)$$

$$I_b \propto \quad (15)$$

$$2A_1A_3 \cos\left[(\Delta_r - \Delta_A)t - (\phi_1 - \phi_3) - \nu_3\left(\frac{x}{c}\sin\theta\right)\right] +$$

$$2A_2A_4 \cos\left[(\Delta_r + \Delta_A)t - (\phi_2 - \phi_4) - \nu_4\left(\frac{x}{c}\sin\theta\right)\right] +$$

$$2A_1A_4 \cos\left[(\Delta_r - \Delta_F)t - (\phi_1 - \phi_4) - \nu_4\left(\frac{x}{c}\sin\theta\right)\right] +$$

$$2A_2A_3 \cos\left[(\Delta_r + \Delta_F)t - (\phi_2 - \phi_3) - \nu_3\left(\frac{x}{c}\sin\theta\right)\right]$$

where $\propto$ is the proportionality sign. Eq. (14) represents a DC term and an interference term between modes 1 and 2 and between 3 and 4. None of these terms are of interest since these patterns are independent of rotation rate. Eq. (15) may be simplified by setting $A_1=A_2$, $A_3=A_4$, and $\phi_i=0$. This substitution gives the following result:

$$I_b \propto 4A_1A_4\left\{\cos\left[2\Delta_A t - (\Delta_A - \Delta_F)\left(\left(\frac{x}{c}\sin\theta\right)\right)\right] + \cos[2\Delta_F t + (\Delta_A - \Delta_F)(x \sin\theta)/c]\right\}\cos\left[2\Delta_r t - (2\omega_o + \Delta_r)\left(\frac{x}{c}\sin\theta\right)\right] \quad (16)$$

Eq. (16) represents the sum of two interferences that are moving in space and oscillating in time with frequencies $\Delta_A$ and $\Delta_F$. These variations are detected by the photodiodes and may easily be filtered out. These interferences have an envelope which is proportional to the multioscillator beat which moves in space and therefore is easily detected by a split diode detector arrangement placed in half quadrature. The distance between the fringes in space and in time is the same as that from an ordinary two mode gyro. The position of the fringe (maximum) of this envelope is given by the argument of the last cosine term in Eq. (16) set to zero, (using $\Delta_r < \omega_0$)

$$2\pi x = \frac{2\pi \Delta_r t}{\frac{\omega_0}{c} \sin \theta} = \frac{\lambda \Delta_r t}{\sin \theta} \quad (17)$$

From Eq. (17) the distance between the fringes is $\lambda/\sin \theta \approx 0.6$ mm for $\lambda = 632.8$ nm and $\theta \approx 10^{-3}$ radian. Hence two detectors spaced 0.1 mm. apart can detect the direction of rotation easily. The rotation rate is the detected beat frequency from any of the two detectors. Note that 100% depth of modulation is shown in Eq. (16) due to the earlier assumption of $A_1 = A_2$ and $A_3 = A_4$. Experimentally this corresponds to the most favored point of operation. The expression given in Eqs. (14) and (15) is a general expression and therefore will be used, after some simplification, in the computer program to generate the desired patterns.

To simplify Eqs. (14) and (15), all dc terms and all terms which oscillate at frequency $\Delta_A$ are eliminated. This frequency is typically several hundred MHz and is filtered out. Furthermore, we shall use $\Psi = \nu_3(x \sin \theta)/c = \nu_4(x \sin \theta)/c$. The total detected intensity given in Eq. (13) becomes $$I_{tot} = \cos\{(\Delta_r - \Delta_F)t - (\phi_1 - \phi_4) - \psi] + \frac{A_2 A_3}{A_1 A_4} \cos[(\Delta_r + \Delta_F)t - (\phi_2 - \phi_3) - \psi] \quad (18)$$

where $\Psi$ represents the added phase shift due to displacement of the detector 52B from the point $x = 0$ in the x-y plane. This phase shift is relative to the developement fringe pattern on the same plane.

To convert to a two mode gyro, assume that $A_2 = A_3 = 0$ and $\Delta_F = \Delta_A = 0$. Eq. (14) becomes $$I_{tot} = \quad (19)$$

$$A_1^2 + A_4^2 + 2A_1 A_2 \cos\left[\Delta_r t - (\phi_1 - \phi_2) - \left(\nu_4 \frac{x}{c} \sin \theta\right)\right].$$

The maximum of this interference pattern is located at $$2\pi x = \frac{\lambda}{\sin \theta} (\Delta_r t - \phi_1 + \phi_4) \quad (20)$$

Comparison of Eqs. (17) and (20) shows that the multioscillator beat is similar to the ordinary two mode beat. Therefore, a properly placed split detector diode and associated electronics can give rotation rate and the direction of rotation.

The above analysis also applies to a twin ring gyro. To convert the equations to those for the twin-ring gyro, set $A_2 = A_3 = 0$. Equation (15) then becomes $$I_{tot} = (A_1^2 + A_4^2)\{1 + m\cos[\Delta_r - \Delta_F)t - (\phi_1 - \phi_4) - (\nu_4(x/c \sin \theta)\}. \quad (21)$$

where $$m = \frac{2A_1 A_4}{A_1^2 + A_4^2} \quad (21)$$

is the modulation depth.

The apparatus includes two photodiodes placed adjacent to each other. One detector is placed at $x = 0$ and the other at a certain point x. The signals from the two detectors are [from Eq. (20)]

$$I_x \propto \cos[(\Delta_r - \Delta_F)t - (\phi_1 - \phi_4)] + B \cos[(\Delta_r + \Delta_F)t - (\phi_2 - \phi_3)] \quad (22)$$

$$I_y \propto \cos[(\Delta_r - \Delta_F)t - (\phi_1 - \phi_4) - \Psi] + B \cos[(\Delta_r + \Delta_F)t - (\phi_2 - \phi_3) - \Psi] \quad (23)$$

where B is the ratio of mode amplitudes, $$B = \frac{A_2 A_3}{A_1 A_4}. \quad (23)$$

One way of examining the phase relationships between the two signals $I_x$ and $I_y$ is to plot one on the x-axis and the other on the y-axis.

Figure 17:
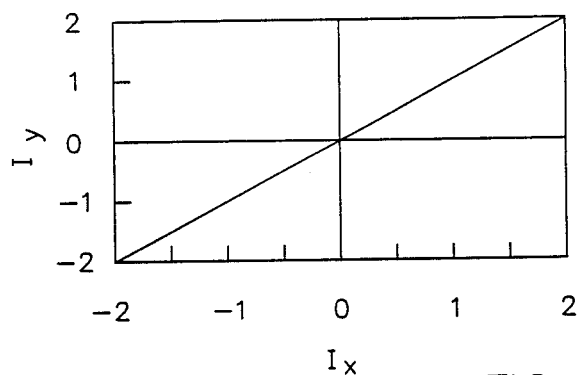
FIG. 17 illustrates one of the signals output from the heterodyne detectors plotted against the other when there is no phase difference between the heterodyne detectors relative to the fringe pattern produced at the detector pair by interference between the light waves propagating in the cavity.
Figure 18:
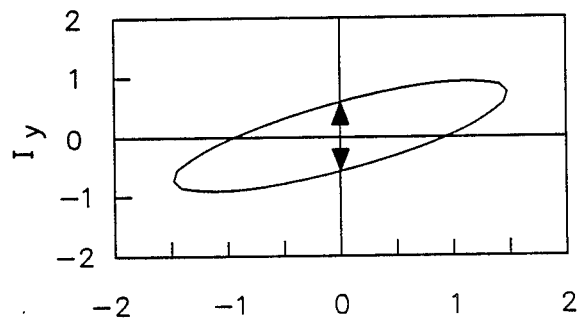
FIG. 18 illustrates one of the signals output from the heterodyne detectors plotted against the other when there is a phase difference between the heterodyne detectors relative to the fringe pattern produced by interference between the light waves propagating in the cavity when the rotation rate is zero.

FIGS. 17–22 are plots of the two signals $I_x$ and $I_y$ versus each other. When the two detectors 52A and 52B are on top of each other, i.e., $\Psi = 0$, the two signals $I_x$ and $I_y$ are in phase, which explains the straight line plot of $I_y$ versus $I_x$ in FIG. 17. Separating the two detectors in space leads to a phase shift, i.e., $\Psi \neq 0$ and thus leads to an ellipse as shown in FIG. 18. An ellipse is generated in the general case because $I_x$ and $I_y$ are identical except for a certain phase shift between them. The generation of the ellipse introduces three parameters; namely, its major axis, its minor axis and the angle the major axis makes with the x-axis.

In FIG. 18, the field amplitude ratio is $B = 0.6$, which indicates that one polarization pair is weaker than the other. This occurs when the frequency average of the modes is tuned away from line-center. Tuning the laser so that the average frequency of the modes is at the line center, such that the field amplitude ratio is $B = 1$, leads to a reduction of the length of the minor axis to zero. Thus the ellipse collapses to a line as shown in FIG. 17. This point corresponds to the 100% depth of modulation of the beat (see FIG. 34). Therefore, monitoring the length of the minor axis, and locking to the minimum point provides means for achieving cavity length control.

Figure 19:
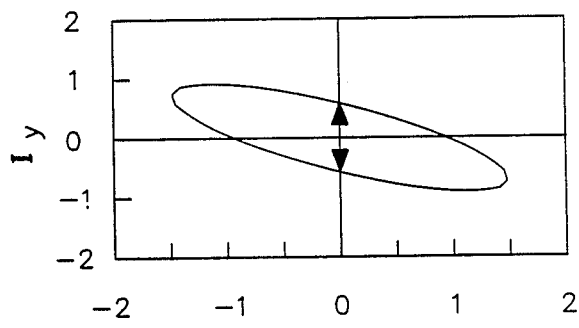
FIG. 19 illustrates the signals of FIG. 17 with added phase shifts due to the residual phase shifts between two of the modes that propagate in the cavity of FIG. 1.
Figure 20:
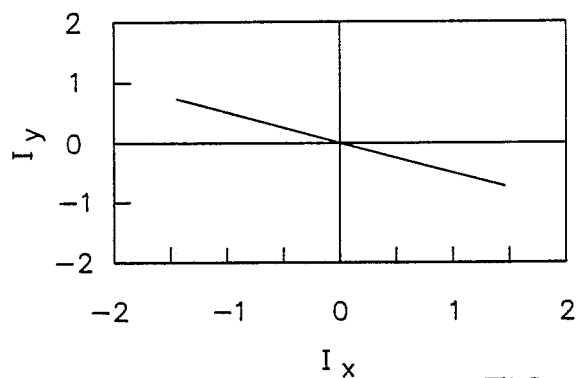
FIG. 20 illustrates the signals of FIG. 18 with added phase shifts due to the residual phase shifts between two of the modes that propagate in the cavity of FIG. 1.
Figure 21:
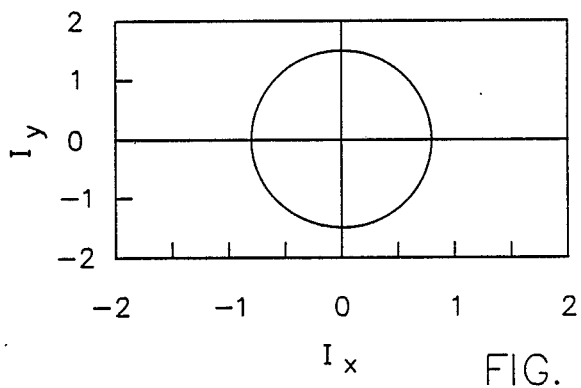
FIG. 21 illustrates one of the signals output from the heterodyne etectors plotted against the other for a twin ring gyro.
Figure 22:
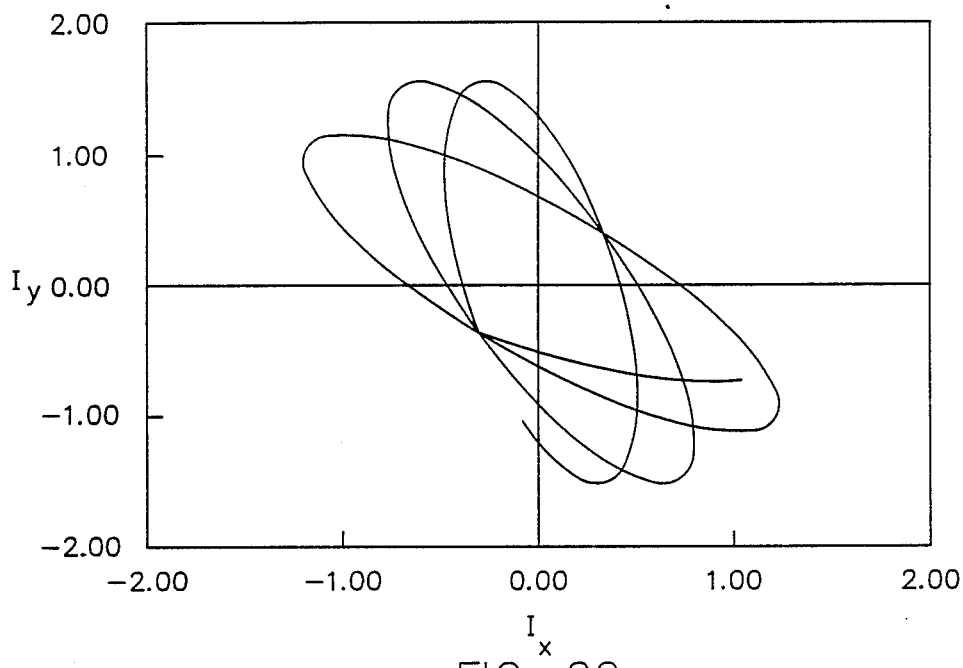
FIG. 22 illustrates one of the signals output from the heterodyne detectors plotted against the other when the hetrodyne detectors of FIG. 7 are in quadrature and the gyro is rotating in space.

FIGS. 19 and 20 contain an added phase shift of $\phi_1 - \phi_4$. This phase difference is assumed to be a residual phase difference between modes 1 and 4. The effect of this phase shift is to rotate the ellipse about the origin. Rotating the gyro 10 leads to a rotation of the ellipse as shown in FIG. 22. Each complete revolution of the ellipse corresponds to one cycle (one count) of the multioscillator beat. Hence information about rotation rate of the gyro is obtained by counting the number of revolutions the ellipse makes per second, or alternatively the number of times per second the angle of the major axis completes 360 degrees. The point on the ellipse (or pattern if the gyro is rotating) that identifies the major axis is found by locating the maximum of $(I_x^2 + I_y^2)^{\frac{1}{2}}$ or simply by locating the maximum length of the vector $|I_x + I_y|$. The minor axis can be determined by locating the minimum of the vector $|I_x + I_y|$.

Since the magnitude of the minimum of the vector $|I_x+I_y|$ is directly related to line center tuning, then this point may be used to locate and lock to line-center. This establishes means of cavity length control which is (1) independent of the state of polarization of the modes outside the cavity and (2) is independent of the rotation rate of the gyro. The first is important in multioscillator gyros since the transmitted light outside the cavity is essentially linearly polarized.

Figure 23:
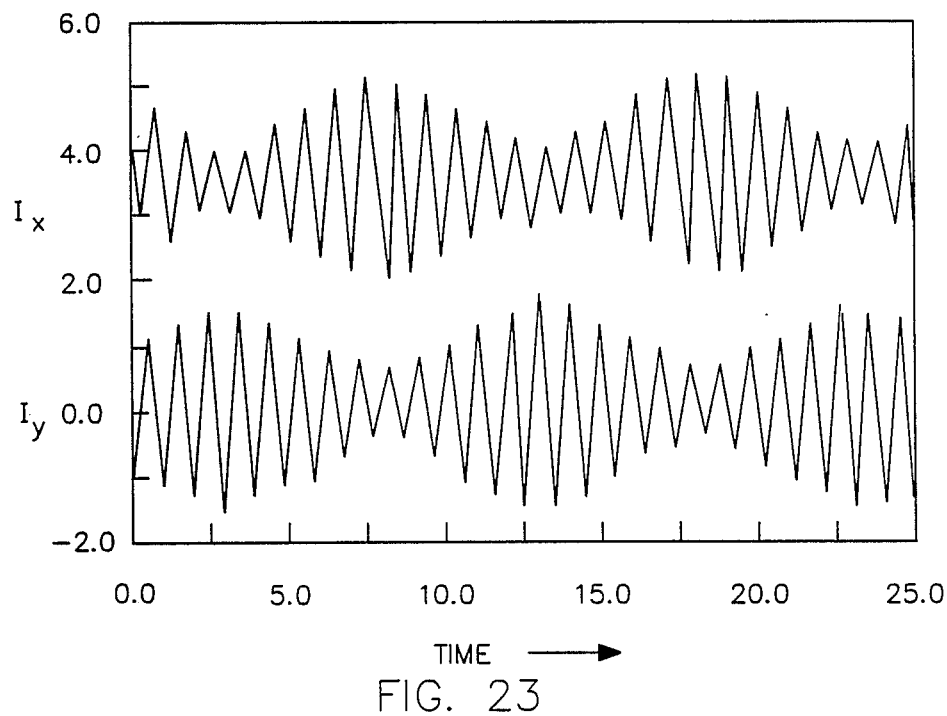
FIG. 23-25 illustrates both signals output from the two heterodyne detectors plotted against time when the heterodyne detectors of FIG. 7 are in quadrature.

Previous methods for cavity length control have the disadvantage of requiring the cavity length to be dithered. The present invention provides cavity length control without the use of dither. This invention uses the fact that the zero crossings of $I_x$ and $I_y$ coincide wth $A_1A_4=A_2A_3$ as shown in FIG. 23. When $A_1A_4=A_2A_3$, a phase shift $\Delta_F$ is introduced between the fast frequencty components of $I_x$ and $I_y$. The magnitude of this phase shift, which leads to the generation of the ellipses shown in FIGS. 22, depends on the ratio $(A_1A_4/A_2A_3)$. The sign of the phase shift depends on whether the magnitude of $(A_1A_4)/(A_2A_3)$ is greater than or less than one. This dependence is shown in FIGS. 23–27.

The circuitry of FIG. 8 keeps track of the alternating phase shifts between $I_x$ and $I_y$. The signals $A_1$ and $B_1$ are squared off conversions of $I_x$ and $I_y$. The phase shift in the $\Delta_F$ beat as $(A_1A_4/A_2A_3)$ changes from $0^-$ to $0^+$ is manifested in the ellipses by a reversal in the direction at which it is traced (per cycle of $\Delta_F$).

The cavity length control function may be achieved as follows. At the positive going zero crossing of $I_x$, the voltage $I_y$ is measured. A sign is then attached to $I_y$ depending of whether the phase difference between $I_x$ and $I_y$ is close to zero or close to 180 degrees (see FIGS. 31–33). The resultant is then amplified and fed to the mirror actuator 122.

The direction of rotation of the gyro may also be obtained from the ellipse by monitoring its direction of rotation as it revolves. This is obtained from the ellipse by observing the direction at which the angle of the major axis is changing. FIG. 22 shows this angle increasing in the counterclockwise direction due to negative rotational frequency splitting $\Delta_r$. The number of times the ellipse of FIG. 22 is traced per second is the non-reciprocal frequency splitting for each case.

The direction of rotation of the gyro is obtained by monitoring the sense of the phase shift between the enevelopes of $I_x$ and $I_y$. The envelope of the signal is the multioscillator beat while the carrier is the non-reciprocal beat.

Figure 24:
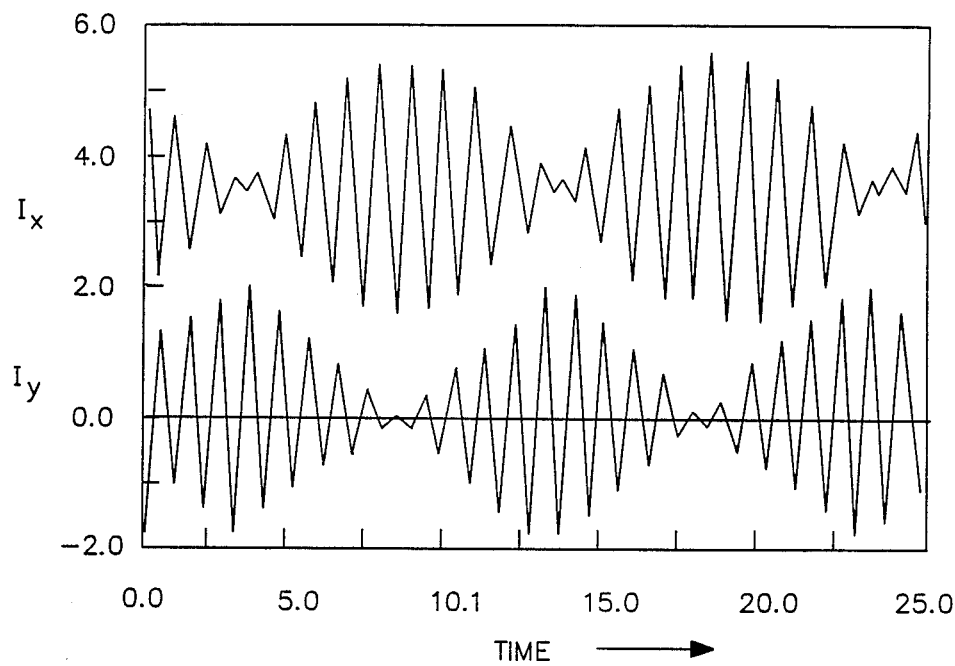
Figure 25:
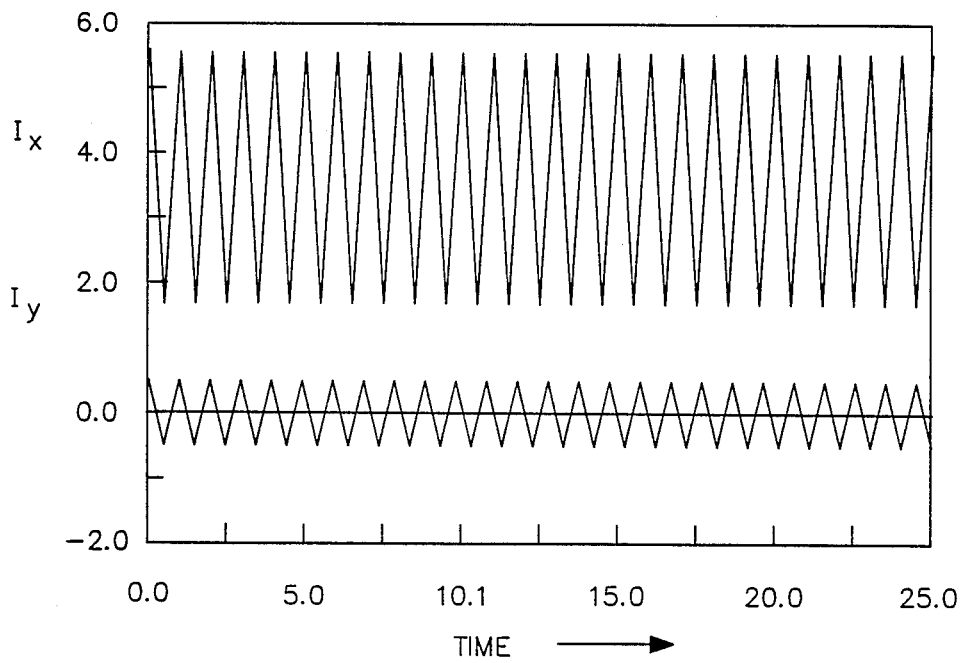

This method involves placing the two heterodyne detectors 52A and 52B ¼th of a fringe apart. FIGS. 23–25 show the waveforms detected when the phase shift is ¼th of a fringe, which is the condition exiting when the detectors 52A and 52B are in quadrature. FIG. 23 represents the signals $I_x$ and $I_y$ for B=0.5, a rotation rate $\Delta_r=-50$ kHz, a non-reciprocal frequency splitting $\Delta_F=1$ MHz, a residual phase shift between modes 1 and 4 of $\phi_1-\phi_4=0.4$ radian, a residual phase shift between modes 2 and 3 of $\phi_2-\phi_3=0$, and a phase shift between the photodetectors of $\Psi=\pi/4$ radian. FIG. 24 represents the signals $I_x$ and $I_y$ for B=1.0, a rotation rate $\Delta_r=50$ KHz, a non-reciprocal frequency splitting $\Delta_F=1$ MHz, a residual phase shift between modes 1 and 4 of $\phi_1-\phi_4=0.4$ radian, a residual phase shift between modes 2 and 3 of $\phi_2-\phi_3=0.0$ radian, and a phase shift between the photo detectors of $\Psi=\pi/4$ radian. FIG. 25 represents the signals $I_x$ and $I_y$ for B=0.6, a rotation rate $\Delta_r=0$KHZ, a non-reciprocal frequency splitting $\Delta_F=1$ MHz, a residual phase shift between modes 1 and 4 of $\phi_1-\phi_4=0.2$ radian, and a residual phase shift between modes 2 and 3 of $\phi_2-\phi_3=0$. In each of FIGS. 26–28 there is a phase shift between the photodetectors of $\Psi=\lambda/2$ radian, which means that they detectors are in half quadrature.

Figure 26:
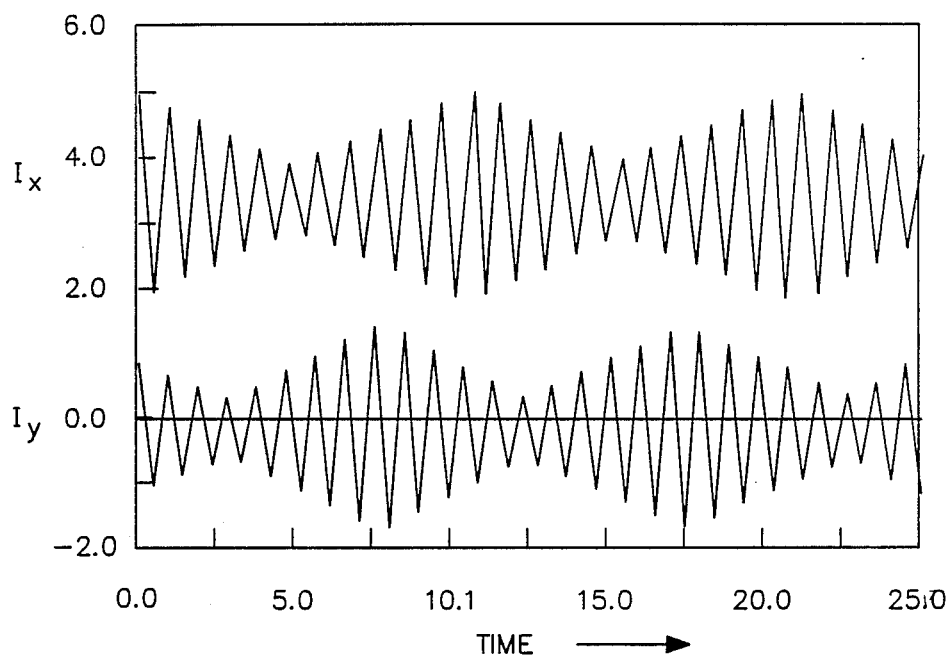
FIGS. 26-27 illustrates both signals output from the two heterodyne detectors plotted against time when the heterodyne detectors of FIG. 7 are in half quadrature.
Figure 27:
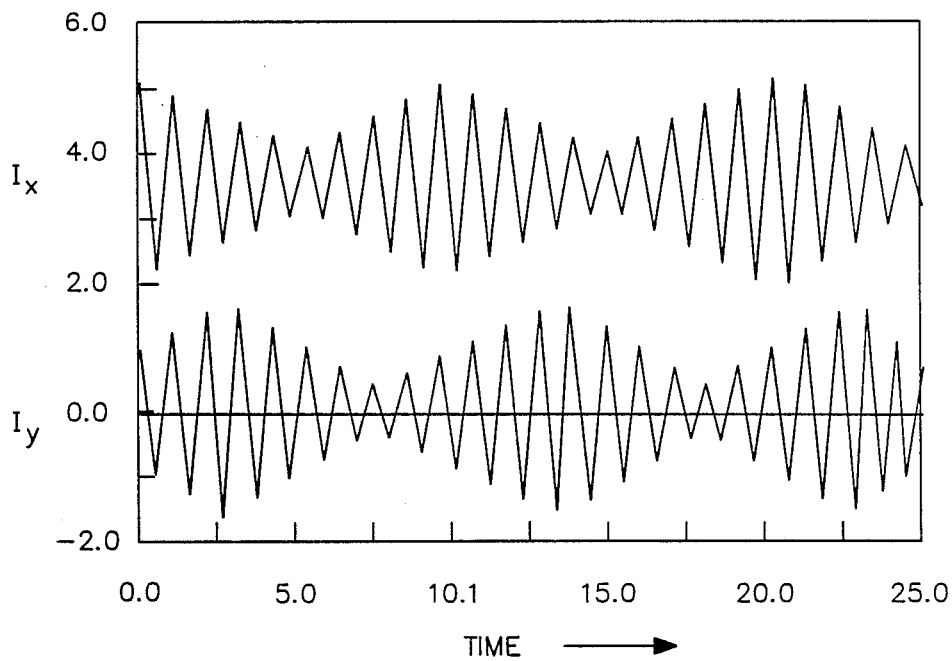

FIGS. 26–27 represent the relations between the signals $I_x$ and $I_y$ when the phase shift between the detectors is $\Psi=\lambda/4$ radian, which is half quadrature condition. FIG. 26 represents the signals $I_x$ and $I_y$ for B=0.6, a rotation rate $\Delta_r=-50$ KHz, a non-reciprocal frequency splitting $\Delta_F=1$ MHz, a residual phase shift between modes 1 and 4 of $\phi_1-\phi_4=0$, and a residual phase shift between modes 2 and 3 of $\phi_2-\phi_3=0$. FIG. 27 represents the signals $I_x$ and $I_y$ for B=0.6, a rotation rate $\Delta_r=50$ KHz, a non-reciprocal frequency splitting $\Delta_F=1$ MHz, a residual phase shift between modes 1 and 4 of $\phi_1-\phi_4=0$, and a residual phase shift between modes 2 and 3 of $\phi_2-\phi_3=0$.

From Eq. (16) the detected signal is the product of a fast varying cosine and a slow varying one. This waveform has the shape shown in FIG. 24 from which one may note that the envelope has effectively doubled in frequency. Therefore, two detectors placed in quadrature would lead to a 180° phase shift. Alternatively a half quadrature placement of the detectors 52A and 52B leads to the more familiar 90° phase shift between the envelopes of $I_x$ and $I_y$. The spectrum of Eq. (16) and the patterns of FIG. 224 are similar to those generated in single-sideband AM radio transmission signals.

Figure 28:
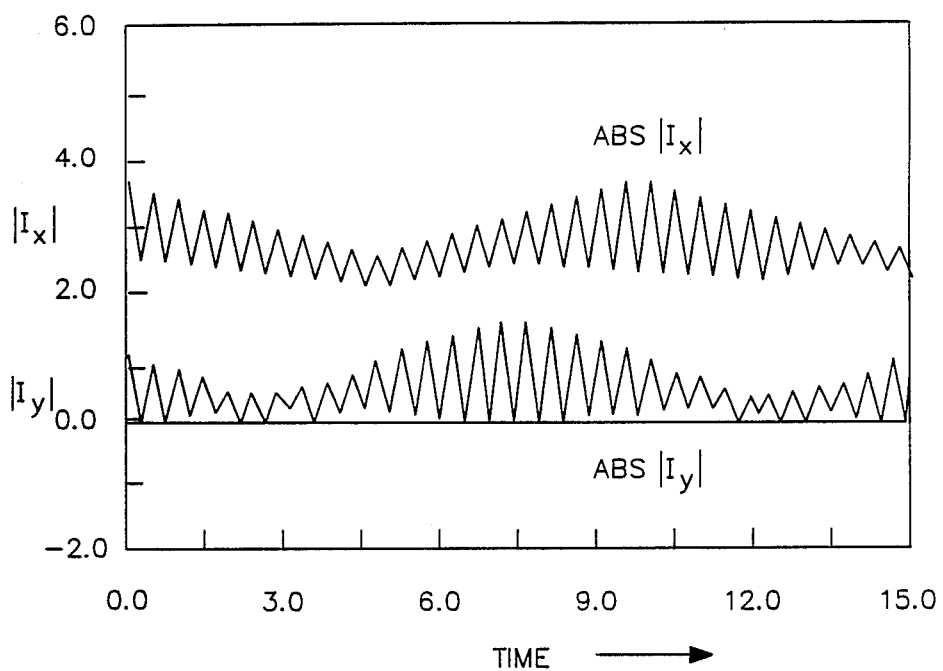
FIG. 28–30 illustrates the absolute value of the heterodyne signal $kI_x$ and the sum of the absolute values of $I_x$ and $I_y$.
Figure 29:
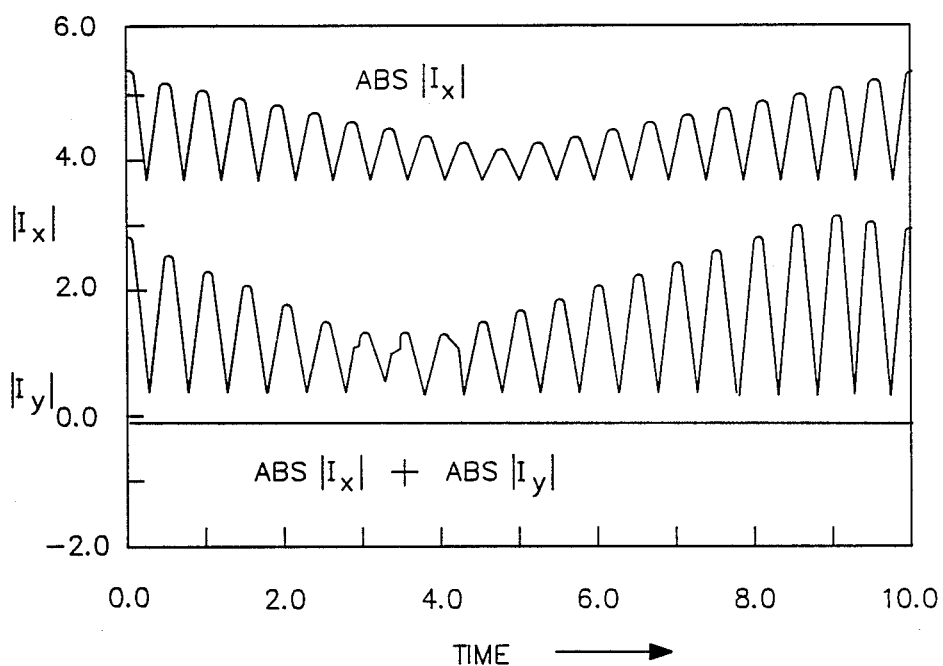
Figure 30:
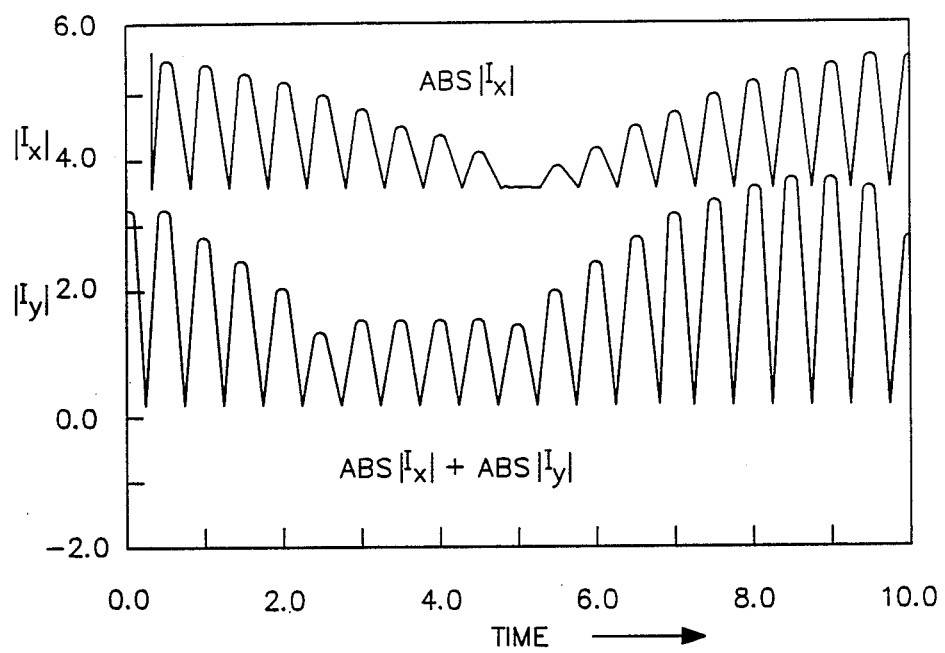

FIGS. 28–30 shows the waveforms for the absolute value of the sum of $I_x$ and $I_y$. In FIG. 28, the upper curve represents $|I_x|$ and the lower curve represents $|I_y \uparrow$. The data for FIG. 28 was obtained for B=0.6; $\Delta_r=-50$ KHz; $\Delta_F=1$ MHz; a residual phase shift between modes 1 and 4 of $\phi_1-\phi_4=0$, a residual phase shift between modes 2 and 3 of $\phi_2-\phi_3=0$; and a phase difference $\Psi=\lambda/4$ between the detectors. In FIG. 29 the upper curve represents $|I_x|$, and the lower curve represents $|I_x|+|I_y|$. In FIG. 30 the upper curve represents $|I_x|$, and the lower curve represents $|I_x|+|I_y|$ for B=1.0; $\Delta_r=-50$ KHz; $\Delta_F=1$ MHz; a residual phase shift between modes 1 and 4 of $\phi_1-\phi_4=0$, a residual phase shift between modes 2 and 3 of $\phi_2-\phi_3=0$; and a phase difference $\Psi=\lambda/4$ between the detectors.

Figure 31:
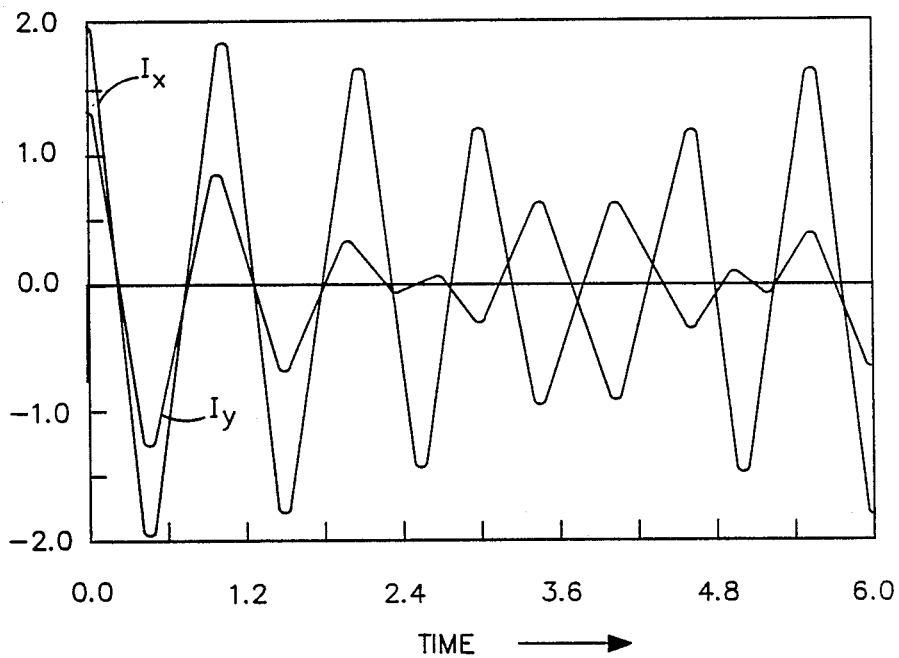
FIGS. 31–33 illustrate relationships between the heterodyne detector outputs that may be used for cavity length control.
Figure 32:
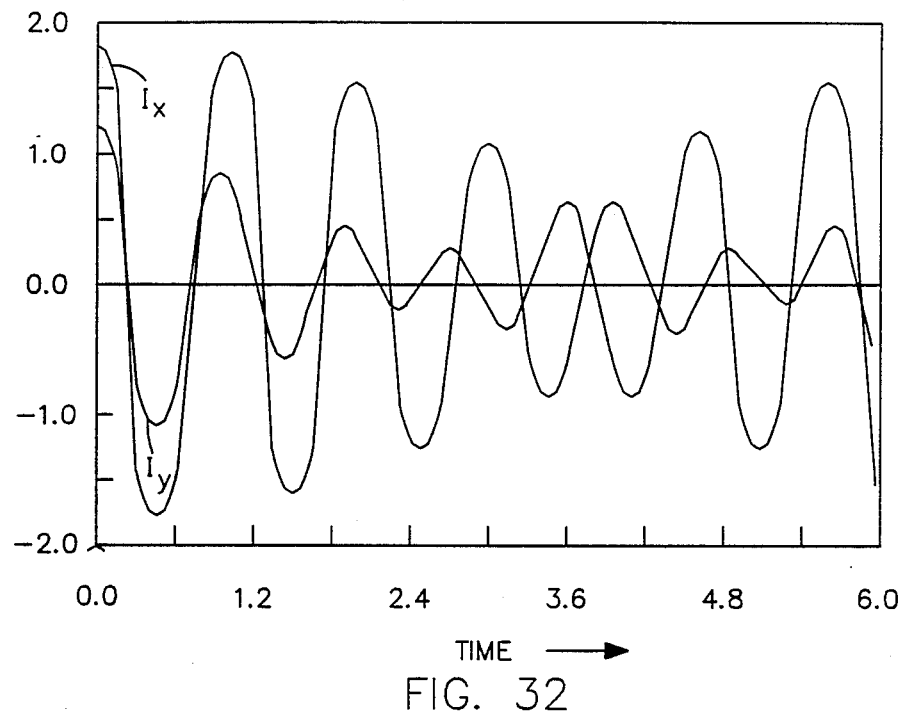
Figure 33:
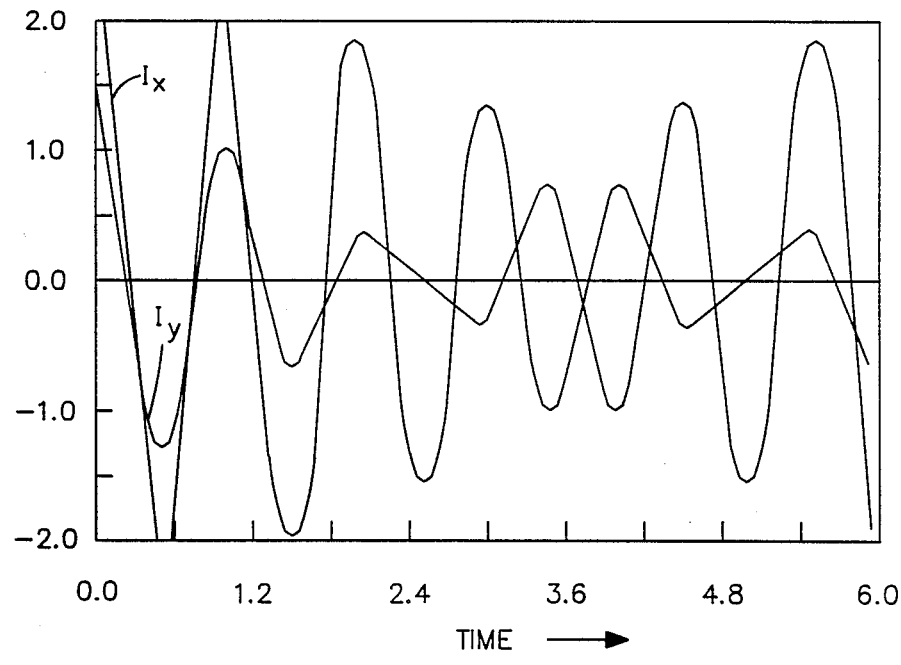
Figure 35:
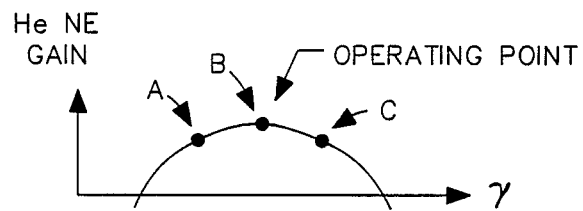
FIG. 35 graphically illustrates a typical gain curve for a HeNe gas discharge ring laser and three operating points for cavity length.

FIGS. 31–33 represent the signals $I_x$ and $I_y$ as functions of time for various operational conditions. FIGS. 31–33 are for $\Delta_r=-50$ KHz; $\Delta_F=1$ MHz; a residual phase shift between modes 1 and 4 of $\phi_1-\phi_4=0$, a residual phase shift between modes 2 and 3 of $\phi_2-\phi_3=0$; and a phase difference $\Psi=\lambda/4$ between the detectors. The field ratio B is 1.0, 0.8, and 1.2, respectively for the three figures. When B≠1.0, there is a phase shift between the fast frequency components of $I_x$ and $I_y$. This phase shift leads to generation of the ellipses shown in FIGS. 17–22. The sign of the phase shift depends upon whether B is less than or greater than 1.0. This is the basis for cavity length control in this invention. The techniques presented herein do not limit the scope of the claims, but are to be considered as examples.

What is claimed is:

1. A multioscillator ring laser gyroscope, comprising:
   frame means for forming a cavity that encloses a closed optical path;
   means for producing four circularly polarized optical waves inside the cavity;

means for combining the waves to produce an interference pattern;

a pair of photodetectors arranged to be in an out of quadrature relation with respect to the interference pattern for producing signals indicative of the interference pattern;

means for monitoring the phase difference of the signals indicative of the interference pattern to determine the direction of the rotation of the multioscillator ring laser gyroscope; and means for processing the signals to provide a cavity length control signal.

2. The multioscillator ring laser gyroscope of claim 1 wherein the pair of photodetectors are in half quadrature with respect to the interference pattern.

3. A multioscillator ring laser gyroscope, comprising:
frame means for forming a cavity that encloses a closed optical path;
means for producing four circularly polarized optical waves inside the cavity;
means for combining the waves to produce an interference pattern;
means for determining the direction of the rotation of the multioscillator ring laser gyroscope from the interference pattern; and
means for processing the interference pattern to provide a cavity length control signal, including:
a pair of photodetectors positioned to receive the interference pattern thereon, a first one of the photodetectors producing a signal $I_x$ indicative of the optical intensity incident thereon, the other one of the photodetectors producing a signal $I_y$ indicative of the optical intensity thereon, the photodetectors being spaced apart so that they are in half quadrature with respect to the interference pattern;
means for determining the occurrence of zero crossings in the signal $I_x$;
means for monitoring the amplitude of the signal $I_y$; and
means for moving at least one of the mirrors relative to the frame to adjust the length of the optical path such that the amplitude of the signal $I_y$ is zero at the zero crossings of the signal $I_x$.

4. The multioscillator ring laser gyroscope of claim 3 wherein the means for determining the occurrence of zero crossings in the signal $I_x$ includes a zero crossing trigger connected to receive the signal $I_x$ from the first photodetector for producing a trigger signal when the signal $I_x$ has zero amplitude.

5. The multioscillator ring laser gyroscope of claim 4 further including an analog to digital converter connected to the second photodetector to receive the signal $I_y$ as an input and connected to the zero crossing trigger to receive the trigger signal, which actuates to analog to digital converter to produce an output that is indicative of the amplitude of the signal $I_y$.

6. The multioscillator ring laser gyroscope of claim 3 wherein the means for determining the occurrence of zero crossings in the signal $I_x$ includes:
an amplifier connected to receive the signal $I_x$ from the first photodetector; a comparator for comparing the output of the amplifier to a reference voltage, the comparator producing a rectangular wave output when the amplitude of the signal from the amplifier exceeds the reference voltage; and
a monostable circuit connected to receive the output of the comparator, the monostable producing an output pulse indicative of the positive-going edge of the comparator output.

7. The multioscillator ring laser gyroscope of claim 6, further including:
a second amplifier connected to the second photodetector to receive the signal $I_y$; and
a sample and hold circuit connected to the output of the second amplifier and connected to the monostable circuit such that the pulses output from the monostable activate the sample and hold circuit to provide an output signal indicative of the amplitude of the signal $I_y$ at the zero crossings of the signal $I_x$.

8. The multioscillator ring laser gyroscope of claim 7, further including:
an integrator connected to the sample and hold circuit to produce a signal indicative of the time average of the signal $I_y$ at the zero crossings of the signal $I_x$; and
a power amplifier connected to the output of the integrator; and
a mirror actuator connected to the power amplifier.

9. A multioscillator ring laser gyroscope, comprising:
frame means for forming a cavity that encloses a closed optical path;
means for producing four circularly polarized optical waves inside the cavity;
means for combining the waves to produce an interference pattern;
a pair of phototdetectors arranged to be in an out of quadrature relation with respect to the interference pattern for producing signals indicative of the interference pattern; and
means for processing the signals indicative of the interference pattern to provide a cavity length control signal.

10. The multioscillator ring laser gyroscope of claim 9 wherein the pair of photodetectors are in half quadrature with respect to the interference pattern.

11. A multioscillator ring laser gyroscope, comprising:
frame means for forming a cavity that encloses a closed optical path;
means for producing four circularly polarized optical waves inside the cavity;
means for combining the waves to produce an interference pattern;
means for processing the interference pattern to provide a cavity length control signal, including:
a pair of photodetectors positioned to receive the interference pattern thereon, a first one of the photodetectors producing a signal $I_x$ indicative of the optical intensity incident thereon, the other one of the photodetectors producing a signal $I_y$ indicative of the optical intensity thereon, the photodetectors being spaced apart so that they are in half quadrature with respect to the interference pattern;
means for determining the occurrence of zero crossings in the signal $I_x$;
means for monitoring the amplitude of the signal $I_y$; and
means for moving at least one of the mirrors relative to the frame to adjust the length of the optical path such that the amplitude of the signal $I_y$ is zero at the zero crossings of the signal $I_x$.

12. The multioscillator ring laser gyroscope of claim 11 wherein the means for determining the occurrence of zero crossings in the signal $I_x$ includes a zero crossing trigger connected to receive the signal $I_x$ from the first photodetector for producing a trigger signal when the signal $I_x$ has zero amplitude.

13. The multioscillator ring laser gyroscope of claim 12 further including an analog to digital converter connected to the second photodetector to receive the signal $I_y$ as an input and connected to the zero crossing trigger to receive the trigger signal, which actuates to analog to digital converter to produce an output that is indicative of the amplitude of the signal $I_y$.

14. The multioscillator ring laser gyroscope of claim 11 wherein the means for determining the occurrence of zero crossings in the signal $I_x$ includes:
   an amplifier connected to receive the signal $I_x$ from the first photodetector; a comparator for comparing the output of the amplifier to a reference voltage, the comparator producing a rectangular wave output when the amplitude of the signal from the amplifier exceeds the reference voltage; and
   a monostable circuit connected to receive the output of the comparator, the monostable producing an output pulse indicative of a selected one of the positive-going or negative going edge of the comparator output.

15. The multioscillator ring laser gyroscope of claim 14, further including:
   a second amplifier connected to the second photodetector to receive the signal $I_y$; and
   a sample and hold circuit connected to the output of the second amplifier and connected to the monostable circuit such that the pulses output from the monostable activate the sample and hold circuit to provide an output signal indicative of the amplitude of the signal $I_y$ at the zero crossings of the signal $I_x$.

16. The multioscillator ring laser gyroscope of claim 15, further including:
   an integrator connected to the sample and hold circuit to produce a signal indicative of the time average of the signal $I_y$ at the zero crossings of the signal $I_x$; and
   a power amplifier connected to the output of the integrator; and
   a mirror actuator connected to the power amplifier.

17. A multioscillator ring laser gyroscope, comprising:
   frame means for forming a cavity that encloses a closed optical path;
   means for producing four circularly polarized optical waves inside the cavity;
   means for combining the waves to produce an interference pattern;
   a pair of photodetectors arranged to be in an out of quadrature relation with respect to the interference pattern for producing signals indicative of the interference pattern; and
   means for measuring the phase difference between the signals indicative of the interference pattern to determine the direction of the rotation of the multioscillator ring laser gryoscope.

18. A method for measuring rotations with a multioscillator ring laser gyroscope, comprising the steps of:
   forming a cavity in a frame to enclose an optical path;
   producing four circularly polarized optical waves inside the cavity;
   combining the waves to produce an interference pattern;
   producing signals indicative of the interference pattern with a pair of photodetectors positioned to be out of quadrature with respect to the interference pattern;
   determining the direction of the rotation of the multioscillator ring laser gyroscope from the phase difference between the signals indicative of the interference pattern; and
   processing the signals indicative of the interference pattern to provide a cavity length control signal.

19. The method of claim 18 including the step of placing the pair of photodetectors to be in half quadrature with respect to the interference pattern.

20. The method of claim 18 wherein the step of processing the interference pattern to provide a cavity length control signal includes the steps of:
   placing a pair of photodetectors to receive the interference pattern thereon;
   producing a signal $I_x$ with a first one of the photodetectors to indicate the optical intensity incident thereon;
   producing a signal $I_y$ with the other one of the photodetectors to indicate the optical intensity thereon;
   spacing the first and second photodetectors spaced so that they are in half quadrature with respect to the interference pattern;
   determining the occurrence of zero crossings in the signal $I_x$;
   monitoring the amplitude of the signal $I_y$; and
   moving at least one of the mirrors relative to the frame to adjust the length of the optical path such that the amplitude of the signal $I_y$ is zero at the zero crossings of the signal $I_x$.

21. The method of claim 20 wherein the step of determining the occurrence of zero crossings in the signal $I_x$ includes:
   connecting a zero crossing trigger to receive the signal $I_x$ from the first photodetector; and
   producing a trigger signal when the signal $I_x$ has zero amplitude.

22. The method of claim 21 further including the steps of:
   connecting an analog to digital converter to the second photodetector to receive the signal $I_y$ as an input;
   connecting the analog to digital converter to the zero crossing trigger to receive the trigger signal; and
   actuating the analog to digital converter to produce an output that is indicative of the amplitude of the signal $I_y$.

23. The method of claim 20 wherein the step of determining the occurrence of zero crossings in the signal $I_x$ includes the steps of:
   connecting an amplifier to receive the signal $I_x$ from the first photodetector;
   comparing the output of the amplifier to a reference voltage with a comparator;
   producing a rectangular wave outpt when the amplitude of the signal from the amplifier exceeds the reference voltage;
   connecting a monostable circuit to receive the output of the comparator; and
   producing an output pulse indicative of one of the negative going edge or the positive-going edge of the comparator output with the monostable circuit.

24. The method of claim 23, further including the steps of:

connecting a second amplifier to the second photodetector to receive the signal $I_y$;
a sampling and holding the output of the second amplifier with a sample and hold circuit;
activating the sample and hold circuit to the monostable circuit with pulses output from the monostable to provide an output signal indicative of the amplitude of the signal $I_y$ at the zero crossings of the signal $I_x$.

25. The method of claim 24, further including the steps of:
producing a signal indicative of the time average of the signal $I_y$ at the zero crossings of the signal $I_x$;
amplifying the signal indicative of the time average of the signal $I_y$ at the zero crossings of the signal $I_x$; and
driving a mirror actuator with the power amplifier.

26. A method for measuring rotation with a multioscillator ring laser gyroscope, comprising the steps of:
forming a cavity that encloses a closed optical path;
producing four circularly polarized optical waves inside the cavity;
combining the waves to produce an interference pattern;
producing signals indicative of the interference pattern with a pair of photodetectors positioned to be out of quadrature with respect to the interference pattern;
processing the signals indicative of the interference pattern to provide a cavity length control signal.

27. The method of claim 26 including the step of placing the pair of photodetectors to be in half quadrature with respect to the interference pattern.

28. A method for measuring rotation with a multioscillator ring laser gyroscope, comprising the steps of:
forming a cavity that encloses a closed optical path;
producing four circularly polarized optical waves inside the cavity;
combining the waves to produce an interference pattern;
processing the signals indicative of the interference pattern to provide a cavity length control signal by a process that: includes the steps of:
placing a pair of photodetectors to receive the interference pattern thereon;
producing a signal $I_x$ with a first one of the photodetectors to indicate the optical intensity incident thereon;
producing a signal $I_y$ with the other one of the photodetectors to indicate the optical intensity thereon;
spacing the first and second photodetectors so that they are in half quadrature with respect to the interference pattern;
determining the occurrence of zero crossings in the signal $I_x$;
monitoring the amplitude of the signal $I_y$; and
moving at least one of the mirrors relative to the frame to adjust the length of the optical path such that the amplitude of the signal $I_y$ is zero at the zero crossings of the signal $I_x$.

29. The method of claim 28 wherein the step of determining the occurrence of zero crossings in the signal $I_x$ includes the steps of:
connecting a zero crossing trigger to receive the signal $I_x$ from the first photodetector; and
producing a trigger signal when the signal $I_x$ has zero amplitude.

30. The method of claim 29 further including the steps of:
connecting an analog to digital converter to the second photodetector to receive the signal $I_y$ as an input;
connecting the analog to digital converter to the zero crossing trigger to receive the trigger signal; and
actuating the analog to digital converter to produce an output that is indicative of the amplitude of the signal $I_y$.

31. The method of claim 28 wherein the step of determining the occurrence of zero crossings in the signal $I_x$ includes the steps of:
connecting an amplifier to receive the signal $I_x$ from the first photodetector;
comparing the output of the amplifier to a reference voltage with a comparator;
producing a rectangular wave output when the amplitude of the signal from the amplifier exceeds the reference voltage;
connecting a monostable circuit to receive the output of the comparator; and
producing an output pulse indicative of one of the negative going edge or the positive-going edge of the comparator output with the monostable circuit.

32. The method of claim 31, further including the steps of:
connecting a second amplifier to the second photodetector to receive the signal $I_y$;
a sampling and holding the output of the second amplifier with a sample and hold circuit;
activating the sample and hold circuit to the monostable circuit with pulses output from the monostable to provide an output signal indicative of the amplitude of the signal $I_y$ at the zero crossings of the signal $I_x$.

33. The method of claim 32, further including the steps of:
producing a signal indicative of the time average of the signal $I_y$ at the zero crossings of the signal $I_x$;
amplifying the signal indicative of the time average of the signal $I_y$ at the zero crossings of the signal $I_x$; and
driving a mirror actuator with the power amplifier.

34. A method for measuring rotations with a multioscillator ring laser gyroscope, comprising the steps of:
forming a cavity that encloses a closed optical path;
producing four circularly polarized optical waves inside the cavity;
combining the waves to produce an interference pattern;
monitoring the interference pattern with a pair of photodetectors that are out of quadrature with respect to the interference pattern to produce a pair of signals indicative of the interference pattern; and
measuring the phase difference between the pair of signals for determining the direction of the rotation of the multioscillator ring laser gyroscope.

35. A multioscillator ring laser gyroscope, comprising:
frame means for forming a cavity that encloses a closed optical path;
means for producing four circularly polarized optical waves inside the cavity;
means for combining the waves to produce an interference pattern;
a pair of photodetectors arranged to be out of quadrature with respect to the interference pattern for producing a pair of electrical signals indicative of the interference pattern;

means for determining the rotation rate from the interference pattern;

means for measuring the phase difference between the pair of electrical signals for determining the direction of the rotation of the multioscillator ring laser gyroscope from the interference pattern; and means for processing the pair of electrical signals indicative of the interference pattern to provide a cavity length control signal.

36. The multioscillator ring laser gyroscope of claim 35 wherein the pair of photodetectors are in half quadrature with respect to the interference pattern.

37. A multioscillator ring laser gyroscope, comprising:

frame means for forming a cavity that encloses a closed optical path;

means for producing four circularly polarized optical waves inside the cavity;

means for combining the waves to produce an interference pattern;

means for determining the rotation rate from the interference pattern;

means for determining the direction of the rotation of the multioscillator ring laser gyroscope from the interference pattern; and means for processing the interference pattern to provide a cavity length control signal, including:

a pair of photodetectors positioned to receive the interference pattern thereon, a first one of the photodetectors producing a signal $I_x$ indicative of the optical intensity incident thereon, the other one of the photodetectors producing a signal $I_y$ indicative of the optical intensity thereon, the photodetectors being spaced apart so that they are in half quadrature with respect to the interference pattern;

means for determining the occurrence of zero crossings in the signal $I_x$;

means for monitoring the amplitude of the signal $I_y$; and means for moving at least one of the mirrors relative to the frame to adjust the length of the optical path such that the amplitude of the signal $I_y$ is zero at the zero crossings of the signal $I_x$.

38. The multioscillator ring laser gyroscope of claim 37 wherein the means for determining the occurrence of zero crossings in the signal $I_x$ includes a zero crossing trigger connected to receive the signal $I_x$ from the first photodetector for producing a trigger signal when the signal $I_x$ has zero amplitude.

39. The multioscillator ring laser gyroscope of claim 38 further including an analog to digital converter connected to the second photodetector to receive the signal $I_y$ as an input and connected to the zero crossing trigger to receive the trigger signal, which actuates to analog to digital converter to produce an output that is indicative of the amplitude of the signal $I_y$.

40. The multioscillator ring laser gyroscope of claim 37 wherein the means for determining the occurrence of zero crossings in the signal $I_x$ includes:

an amplifier connected to receive the signal $I_x$ from the first photodetector; a comparator for comparing the output of the amplifier to a reference voltage, the comparator producing a rectangular wave output when the amplitude of the signal from the amplitude exceeds the reference voltage; and a monstable circuit connected to receive the output of the comparator, the monostable producing an output pulse indicative of the positive-going edge of the comparator output.

41. The multioscillator ring laser gyroscope of claim 40, further including:

a second amplifier connected to the second photodetector to receive the signal $I_y$; and a sample and hold circuit connected to the output of the second amplifier and connected to the monostable circuit such that the pulses output from the monostable activate the sample and hold circuit to provide an output signal indicative of the amplitude of the signal $I_y$ at the zero crossings of the signal $I_x$.

42. The multioscillator ring laser gryoscope of claim 41, further including:

an integrator connected to the sample and hold circuit to produce a signal indicative of the time average of the signal $I\Psi$ at the zero crossings of the signal $I_x$; and a power amplifier connected to the output of the integrator; and a mirror actuator connected to the power amplifier.

43. A multioscillator ring laser gyroscope, comprising:

frame means for forming a cavity that encloses a closed optical path;

means for producing four circularly polarized optical waves inside the cavity;

means for combining the waves to produce an interference pattern;

a pair of photodetectors placed in the interference pattern in half quadrature with respect to the interference pattern producing oscillatory signals indicative of the interference pattern;

means for determining the rotation rate of the ring laser gyroscope from the oscillatory signals;

means for determining the direction of rotation of the multioscillator ring laser gyroscope from the interference pattern; and means for processing the interference pattern to provide a cavity length control signal.

* * * * *